United States Patent
Ogawa et al.

(10) Patent No.: US 10,769,507 B2
(45) Date of Patent: Sep. 8, 2020

(54) IMAGE FORMING APPARATUS AND IMAGE FORMING METHOD FOR PROHIBITING OR ALLOWING RECOVERY PRINTING BASED ON NUMBER OF TIMES OF PRINTING IN CASE OF DISCREPANCY BETWEEN SIZES OF SHEET

(71) Applicants: Tetsuya Ogawa, Ibaraki (JP); Takahiro Miyakawa, Kanagawa (JP)

(72) Inventors: Tetsuya Ogawa, Ibaraki (JP); Takahiro Miyakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/549,012

(22) Filed: Aug. 23, 2019

(65) Prior Publication Data

US 2020/0074252 A1    Mar. 5, 2020

(30) Foreign Application Priority Data

Aug. 31, 2018    (JP) .................................. 2018-163754

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC ........ *G06K 15/408* (2013.01); *G06K 15/4025* (2013.01); *G06K 15/4065* (2013.01)

(58) Field of Classification Search
CPC ............. G06K 15/408; G06K 15/4025; G06K 15/4065

USPC ............................... 358/1.1, 1.13, 1.14, 1.15
See application file for complete search history.

(56) References Cited

U.S. PATENT DOCUMENTS

| | | | |
|---|---|---|---|
| 2008/0205955 A1* | 8/2008 | Tanigami | B42C 1/10 399/407 |
| 2009/0190936 A1 | 7/2009 | Masui et al. | |
| 2012/0063790 A1 | 3/2012 | Ogawa | |
| 2013/0258391 A1* | 10/2013 | Maeda | G06K 15/4085 358/1.14 |
| 2013/0341854 A1 | 12/2013 | Miyakawa et al. | |
| 2015/0151944 A1* | 6/2015 | Shirasaki | B65H 43/08 270/58.08 |

FOREIGN PATENT DOCUMENTS

| | | |
|---|---|---|
| JP | 2001-075770 | 3/2001 |
| JP | 2009-203074 | 9/2009 |

* cited by examiner

*Primary Examiner* — Douglas Q Tran
(74) *Attorney, Agent, or Firm* — IPUSA, PLLC

(57) ABSTRACT

An image forming apparatus includes a conveyor, a sensor, and control circuitry. The conveyor is configured to convey a sheet. The sensor is configured to detect the sheet conveyed by the conveyor. The control circuitry is configured to cause the conveyor to eject the sheet without stopping conveyance of the sheet and prohibit recovery printing when a size of the sheet determined based on detection of the sheet by the sensor is different from a setting size in a first operation mode. The control circuitry is configured to cause the conveyor to stop conveyance of the sheet and allow recovery printing when the size of the sheet is different from the setting size in a second operation mode in which a number of times of printing is larger than a number of times of printing in the first operation mode.

11 Claims, 16 Drawing Sheets

FIG. 3

| | |
|---|---|
| RAM 60a | MANAGEMENT NUMBER A<br><br>MANAGEMENT NUMBER A-1<br>PRINTING MODE (SETTING SIZE, TRAY, SELECTION OF SINGLE-SIDED PRINTING OR DOUBLE-SIDED PRINTING, IMAGE DATA, ⋯)<br><br>MANAGEMENT NUMBER A-2<br>PRINTING MODE (SETTING SIZE, TRAY, SELECTION OF SINGLE-SIDED PRINTING OR DOUBLE-SIDED PRINTING, IMAGE DATA, ⋯)<br><br>⋮<br><br>MANAGEMENT NUMBER A-m<br>PRINTING MODE (SETTING SIZE, TRAY, SELECTION OF SINGLE-SIDED PRINTING OR DOUBLE-SIDED PRINTING, IMAGE DATA, RECOVERY INFORMATION, ⋯) |
| RAM 70a | MANAGEMENT NUMBER A<br><br>MANAGEMENT NUMBER A-1<br>PRINTING MODE (SETTING SIZE, TRAY, SELECTION OF SINGLE-SIDED PRINTING OR DOUBLE-SIDED PRINTING, ⋯)<br><br>MANAGEMENT NUMBER A-2<br>PRINTING MODE (SETTING SIZE, TRAY, SELECTION OF SINGLE-SIDED PRINTING OR DOUBLE-SIDED PRINTING, ⋯)<br><br>⋮<br><br>MANAGEMENT NUMBER A-m<br>PRINTING MODE (SETTING SIZE, TRAY, SELECTION OF SINGLE-SIDED PRINTING OR DOUBLE-SIDED PRINTING, ⋯) |

WAY OF OPERATION 1

| OPER-ATION MODE | CONDITION FOR OPERATION MODE | EJECTION OR PAPER JAM STOP | DISPLAY OF DIS-CREPANCY BETWEEN SIZES OF SHEET | RECOVERY PRINTING |
|---|---|---|---|---|
| MD1 | ONE | EJECTION | YES | PROHIBITED |
| MD2 | TWO OR MORE | PAPER JAM STOP | YES | ALLOWED |

FIG. 9A

DISPLAY OF PAPER JAM STOP

 PAPER JAM HAS OCCURRED

REMOVE SHEET

DISPLAY OF DISCREPANCY BETWEEN SIZES OF SHEET

 DISCREPANCY BETWEEN EJECTED SHEET AND CONTENTS OF SETTINGS BYPASS TRAY

CONTENTS OF SETTINGS A5

CHECK SIZE OF SHEET ACCORDING TO FOLLOWING PROCEDURES

1. CHECK ORIENTATION IN WHICH SHEET IS LOADED
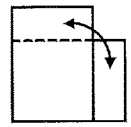

2. CHECK SIZE OF SHEET

3. ADJUST SHEET GUIDE PLATE
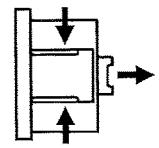

DISPLAY OF RECOVERY PRINTING

WOULD YOU LIKE RECOVERY PRINTING

[ END WITHOUT PRINTING ]     [ PERFORM RECOVERY PRINTING ]

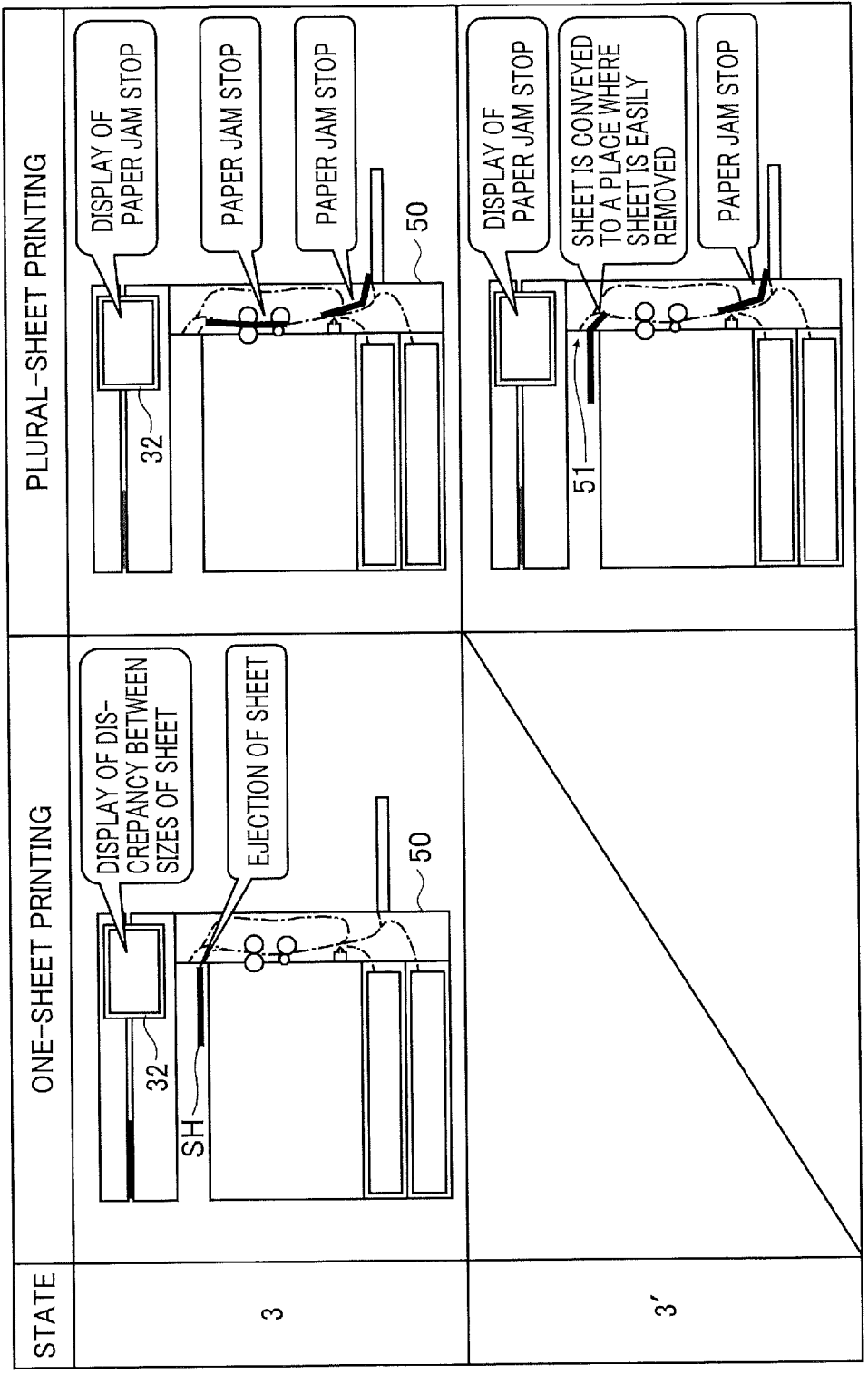

FIG. 11A

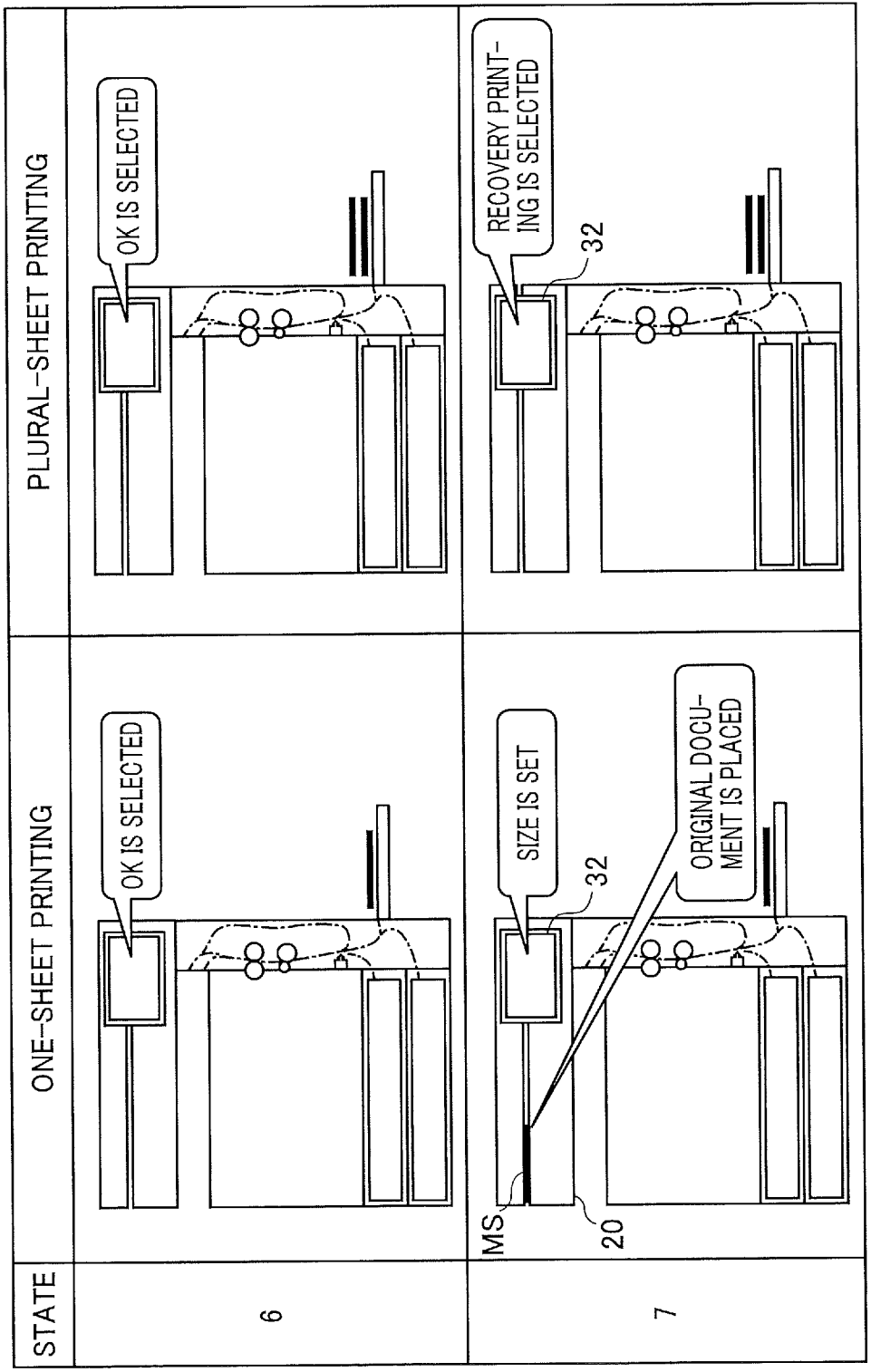

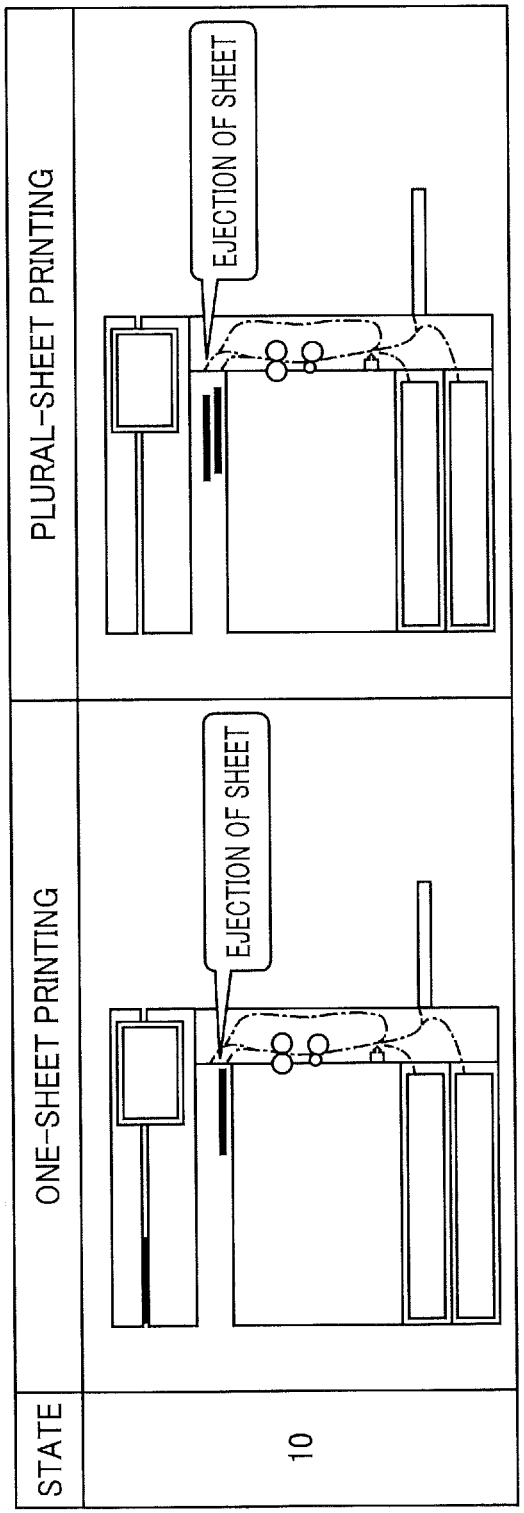

FIG. 13A

WAY OF OPERATION 2

| OPERATION MODE | CONDITION FOR OPERATION MODE (n AN INTEGER THAT IS EQUAL TO OR LARGER THAN TWO) | EJECTION OR PAPER JAM STOP | DISPLAY OF DISCREPANCY BETWEEN SIZES OF SHEET | RECOVERY PRINTING |
|---|---|---|---|---|
| MD1 | EQUAL TO OR SMALLER THAN n | EJECTION | YES | PROHIBITED |
| MD2 | EQUAL TO OR LARGER THAN n+1 | PAPER JAM STOP | YES | ALLOWED |

FIG. 13B

WAY OF OPERATION 3

| OPERATION MODE | CONDITION FOR OPERATION MODE (m AN INTEGER THAT IS EQUAL TO OR LARGER THAN ONE) | EJECTION OR PAPER JAM STOP | DISPLAY OF DISCREPANCY BETWEEN SIZES OF SHEET | RECOVERY PRINTING |
|---|---|---|---|---|
| MD1 | EQUAL TO OR SMALLER THAN m, AND SINGLE-SIDED PRINTING, AND PARTICULAR SHEET FEED TRAY | EJECTION | YES | PROHIBITED |
| MD2 | CONDITIONS FOR MD1 ARE NOT SATISFIED | PAPER JAM STOP | YES | ALLOWED |

FIG. 13C

WAY OF OPERATION 4

| OPERATION MODE | CONDITION FOR OPERATION MODE (m AN INTEGER THAT IS EQUAL TO OR LARGER THAN ONE) | EJECTION OR PAPER JAM STOP | DISPLAY OF DISCREPANCY BETWEEN SIZES OF SHEET | RECOVERY PRINTING |
|---|---|---|---|---|
| MD1 | EQUAL TO OR SMALLER THAN m, AND SINGLE-SIDED PRINTING, AND BYPASS TRAY | EJECTION | YES | PROHIBITED |
| MD2 | CONDITIONS FOR MD1 ARE NOT SATISFIED | PAPER JAM STOP | YES | ALLOWED |

FIG. 13D

WAY OF OPERATION 5

| OPERATION MODE | CONDITION FOR OPERATION MODE (m AN INTEGER THAT IS EQUAL TO OR LARGER THAN ONE) | | EJECTION OR PAPER JAM STOP | DISPLAY OF DISCREPANCY BETWEEN SIZES OF SHEET | RECOVERY PRINTING |
|---|---|---|---|---|---|
| MD1 | EQUAL TO OR SMALLER THAN m, AND SINGLE-SIDED PRINTING, AND BYPASS TRAY | SETTING SIZE ≤ SIZE OF FED SHEET | EJECTION | YES | PROHIBITED |
| MD1' | | SETTING SIZE > SIZE OF FED SHEET | | | ALLOWED |
| MD2 | EQUAL TO OR LARGER THAN m + 1 | | PAPER JAM STOP | YES | ALLOWED |

# IMAGE FORMING APPARATUS AND IMAGE FORMING METHOD FOR PROHIBITING OR ALLOWING RECOVERY PRINTING BASED ON NUMBER OF TIMES OF PRINTING IN CASE OF DISCREPANCY BETWEEN SIZES OF SHEET

CROSS-REFERENCE TO RELATED APPLICATION

This patent application is based on and claims priority pursuant to 35 U.S.C. § 119(a) to Japanese Patent Application No. 2018-163754, filed on Aug. 31, 2018, in the Japan Patent Office, the entire disclosure of which is hereby incorporated by reference herein.

BACKGROUND

Technical Field

The present invention relates to an image forming apparatus.

Related Art

An image forming apparatus, such as a multifunction printer (MFP), includes a conveyance path along which a sheet is conveyed in the image forming apparatus. A conveyance sensor is disposed along the conveyance path and detects the conveyed sheet. If a time at which the conveyance sensor detects a sheet is out of a predetermined range of times, the image forming apparatus detects occurrence of an error of paper jam (paper jam), and stops conveyance of the sheet.

An error of paper jam not only occurs when a sheet jams the conveyance path, but also occurs when a size of a sheet that has been set by a user is different from a size of a sheet fed from a sheet feed tray. If a size of a sheet that has been wrongly set causes an error of paper jam, and conveyance of a sheet is stopped, a user needs to remove the sheet from an image forming apparatus despite a fact that paper jam is not occurring.

To deal with the problem, an image forming apparatus has been proposed that does not stop a sheet in a conveyance path and ejects the sheet if a size of a sheet that has been set by a user is different from a size of a sheet fed from a sheet feed tray. If a size of a sheet that has been set by a user is different from a size of a sheet fed from a sheet feed tray, this kind of image forming apparatus does not print an image on a sheet, keeps image data, uses the kept image data to perform what is called recovery printing.

However, if an image forming apparatus that prints a composite color image sequentially forms images that have a plurality of different colors, the image forming apparatus starts processing for printing of an image before the image forming apparatus detects a size of a sheet. Therefore, if the image forming apparatus detects discrepancy between sizes of a sheet, the image forming apparatus ejects a sheet on which an image is printed. In that case, after the image forming apparatus that detects discrepancy between sizes of a sheet ejects the printed sheet, the image forming apparatus waits for an instruction of recovery printing. If a user does not notice discrepancy between sizes of a sheet, misunderstands that printing has been normally completed, and takes away the sheet, a person who is not the user may perform recovery printing. Therefore, the image forming apparatus is not secure. Further, if a number of sheets to be printed is set to two or more, and discrepancy between sizes of a sheet is detected, images are printed on a plurality of sheets that each has a size that is different from a size of a sheet a user originally expects. Consequently, sheets are wasted.

SUMMARY

In an aspect of the present invention, an image forming apparatus includes a conveyor, a sensor, and control circuitry. The conveyor is configured to convey a sheet. The sensor is configured to detect the sheet conveyed by the conveyor. The control circuitry is configured to cause the conveyor to eject the sheet without stopping conveyance of the sheet and prohibit recovery printing when a size of the sheet determined based on detection of the sheet by the sensor is different from a setting size in a first operation mode. The control circuitry is configured to cause the conveyor to stop conveyance of the sheet and allow recovery printing when the size of the sheet is different from the setting size in a second operation mode in which a number of times of printing is larger than a number of times of printing in the first operation mode.

In another aspect of the present invention, an image forming method includes detecting a sheet conveyed by a conveyor; causing the conveyor to eject the sheet without stopping conveyance of the sheet and prohibiting recovery printing when a size of the sheet determined based on detection of the sheet is different from a setting size in a first operation mode; and causing the conveyor to stop conveyance of the sheet and allowing recovery printing when the size of the sheet is different from the setting size in a second operation mode in which a number of times of printing is larger than a number of times of printing in the first operation mode.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is an illustration illustrating an example of printing-mode information stored in random-access memory (RAM) in FIG. 1;

FIGS. 9A to 9C are illustrations illustrating an example of a display an operating panel in FIG. 1 displays;

FIGS. 10A and 10B are diagrams of general operation at a time of occurrence of discrepancy between sizes of a sheet in the image forming apparatus in FIG. 1;

FIGS. 11A and 11B are diagrams of general operation subsequent to FIG. 10B;

FIGS. 12A and 12B are diagrams of general operation subsequent to FIG. 11B; and

FIGS. 13A to 13D are tables of examples of ways of operation at a time of occurrence of discrepancy between sizes of a sheet in an image forming apparatus according to another embodiment of the present invention.

Figure 1:
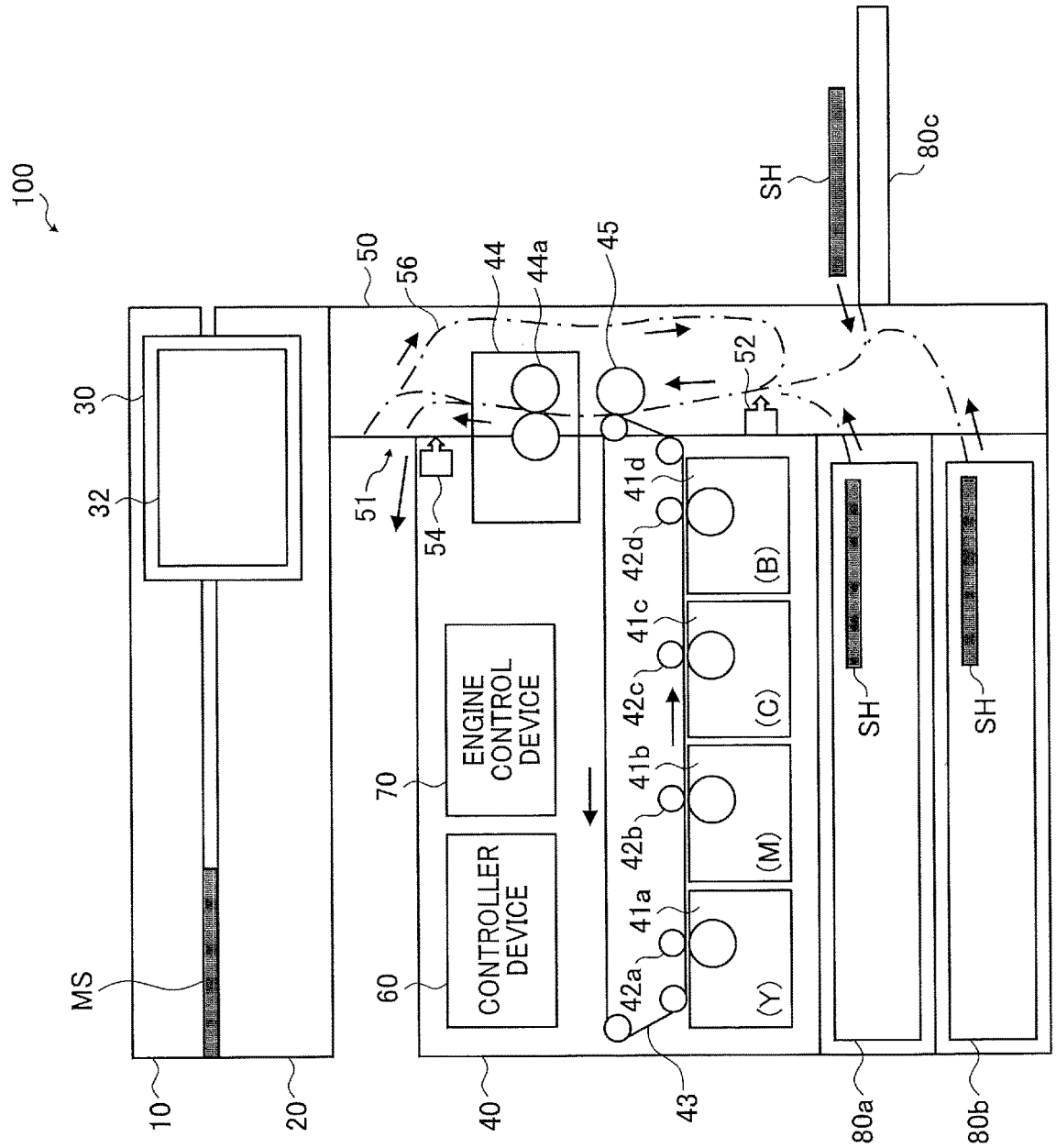
FIG. 1 is a diagram of general arrangement of an image forming apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, embodiments will be described with reference to the drawings.

FIG. 1 is a diagram of general arrangement of an image forming apparatus according to an embodiment of the present invention. An image forming apparatus 100 illustrated in FIG. 1 is a multifunction printer that has copying functions, printer functions, scanner functions, and facsimile functions, for example. The image forming apparatus 100 may be a copy machine or a printer. In addition to the copying functions, the image forming apparatus 100 may have functions for printing image data the image forming apparatus 100 receives through a local area network (LAN), and functions for printing image data the image forming apparatus 100 receives through universal serial bus (USB). The image and the image data may include text, such as a sentence.

For example, the image forming apparatus 100 includes a platen 10, a scanner section 20, an operating section 30, a printer section 40, a conveyance section 50, a controller device 60, an engine control device 70, and a sheet feed device that includes sheet feed trays 80a and 80b, and a bypass tray 80c. Hereinafter, the sheet feed trays 80a and 80b, and the bypass tray 80c will be referred to as trays 80.

The platen 10 presses an original document MS placed on the scanner section 20 against the scanner section 20, and keeps the original document MS smooth between the platen 10 and the scanner section 20. The platen 10 may include an auto document feeder (ADF).

The scanner section 20 scans the original document MS to generate image data. The operating section 30 includes an operating panel 32. For example, the operating panel 32 displays a start button for printing, and a plurality of buttons for settings that is used to set a number of copies to print, a size of a sheet (one of the trays 80 to be used), and a print magnification. The start button for printing and the plurality of buttons for settings are operable. If an error occurs at a time of printing, the operating panel 32 displays an error message, and buttons that allow a user to select a measure against the error.

For example, the printer section 40 includes four image forming devices 41 (41a, 41b, 41c, and 41d), four transfer rollers 42 (42a, 42b, 42c, and 42d) as a transfer device, an intermediate transfer belt 43, a fixing device 44, and a sheet transfer roller 45. Part of the fixing device 44, and the sheet transfer roller 45 are disposed within the conveyance section 50. However, the part of the fixing device 44 and the sheet transfer roller 45 are part of the printer section 40. The image forming devices 41a, 41b, 41c, and 41d contain yellow (Y) toner, magenta (M) toner, cyan (C) toner, and black (B) toner, respectively, and form respective images that have respective different colors. The intermediate transfer belt 43 is disposed between the image forming device 41 and the transfer roller 42 that correspond to each of the colors. The intermediate transfer belt 43 moves in a direction of arrows illustrated in FIG. 1. The image forming devices 41 are an example of an image forming device.

The sheet feed trays 80a and 80b are disposed within an accommodating space that is at a lower portion of the printer section 40. The bypass tray 80c is disposed at an opening of a side of the conveyance section 50. A plurality of sheets SH that has a predetermined size is loaded onto each of the sheet feed trays 80a and 80b, and the bypass tray 80c.

The conveyance section 50 includes a conveyance sensor 52 and an ejection sensor 54. The ejection sensor 54 is disposed within the printer section 40, but is part of the conveyance section 50. A number of sensors disposed within the conveyance section 50 is not limited to two. A chain line illustrated in the conveyance section 50 illustrates a conveyance path along which a sheet SH is conveyed.

As illustrated by arrows along the conveyance path, the conveyance section 50 picks up a sheet SH from one of the trays 80 selected by a user, conveys the sheet SH through the sheet transfer roller 45 and the fixing device 44 in this order, and ejects the sheet SH on which an image is printed through an ejection port 51. If double-sided printing is selected, a sheet SH conveyed from the fixing device 44 to the ejection port 51 is conveyed through a double-sided-printing path 56, is turned over, and is conveyed to the sheet transfer roller 45.

A user who intends to copy an original document MS places the original document MS between the platen 10 and the scanner section 20, sets a number of copies to print, and a size of a sheet (one of the trays 80 to be used) with the operating panel 32, and selects (presses down) the start button for printing. Consequently, an image of the original document MS is printed on a sheet SH fed from the selected tray 80. The selection of the start button for printing is an example of a request for printing.

If a user intends to print image data processed with a computer connected to the image forming apparatus 100 through a LAN or USB, the user sets a number of copies to print, and a size of a sheet (one of the trays 80 to be used) by means of a display of settings displayed on a screen of the computer. The display of settings includes elements similar to elements displayed on the operating panel 32. The user's selecting the start button for printing in the display of settings allows an image data to be printed on a sheet SH fed from one of the trays 80 that has been selected.

Hereinafter, copying an original document MS placed between the platen 10 and the scanner section 20 will be mainly described as an example. However, the following description is applicable to printing of image data processed with a computer if contents displayed on the operating panel 32 is displayed in a display of settings on a screen of the computer. However, since image data is transmitted from the computer, the scanner section 20 does not need to scan.

The controller device 60 controls operation of the whole image forming apparatus 100, and performs processing for printing. Based on selection of the start button for printing, the controller device 60 transmits a request for a start of operation of forming an image to the engine control device 70. The controller device 60 manages image data generated by scanning of the scanner section 20, and transmits the image data to the engine control device 70, in addition to the transmission of the request for a start.

Based on receipt of the request for a start, the engine control device 70 controls the image forming devices 41, and uses the image data the engine control device 70 has received to make each of the image forming devices 41 form an image. At that time, a yellow image formed by the image forming device 41a is transferred to the intermediate transfer belt 43 by a transfer roller 42a to which high voltage is applied.

The image forming device 41b forms a magenta image synchronously with arrival of the yellow image transferred to the intermediate transfer belt 43 at a transfer roller 42b. Then the image forming device 41b transfers the magenta image on the yellow image transferred to the intermediate transfer belt 43. Similarly, a cyan image formed by the image forming device 41c, and a black image formed by the image forming device 41d are transferred to the intermediate transfer belt 43 in this order. Consequently, a full color image is formed on the intermediate transfer belt 43.

The conveyance section 50 operates based on control of the engine control device 70. The conveyance section 50 picks up a sheet SH from one of the trays 80 selected by a user, and conveys the sheet SH to the sheet transfer roller 45 synchronously with arrival of the full color image on the intermediate transfer belt 43 at the sheet transfer roller 45. The full color image on the intermediate transfer belt 43 is transferred to the sheet SH that arrives at the sheet transfer roller 45 by high voltage applied to the sheet transfer roller 45. The conveyance section 50 conveys the sheet SH to which the full color image is transferred to the fixing device 44. The conveyance section 50 is an example of a conveyor that conveys a sheet SH.

The fixing device 44 includes fixing rollers 44a. The fixing device 44 operates based on control of the engine control device 70. The fixing device 44 sandwiches the sheet SH that has been conveyed to the fixing device 44 between the fixing rollers 44a that is heated to melt and fix a toner image on the sheet SH to the sheet SH. The conveyance section 50 conveys the sheet SH that has passed the fixing device 44 to the ejection port 51, and ejects the sheet SH through the ejection port 51. If an image has been printed on one side of a sheet SH and another image is being printed on the other side of the sheet SH (i.e. double-sided printing is performed), the conveyance section 50 conveys the sheet SH to the sheet transfer roller 45 through the double-sided-printing path 56, without ejecting the sheet SH through the ejection port 51 as described above.

The engine control device 70 monitors the ejection sensor 54 disposed at the ejection port 51. If the engine control device 70 detects passage of the sheet SH through the ejection sensor 54, the engine control device 70 notifies the controller device 60 of normal ejection of the sheet SH. Based on the notification from the engine control device 70, the controller device 60 displays information that indicates completion of the printing on the operating panel 32.

The engine control device 70 uses the conveyance sensor 52 disposed at the conveyance section 50 to measure a time at which a sheet SH arrives at the conveyance sensor 52, and a time at which the sheet SH passes the conveyance sensor 52. Based on results of the measurement, the engine control device 70 calculates a period of time for which the sheet SH passes the conveyance sensor 52. The engine control device 70 determines whether or not the calculated period of time is within a predetermined range of periods of time. The conveyance sensor 52 is an example of a sensor that detects a sheet SH conveyed through the conveyance section 50. For example, the predetermined range of periods of time may be changed based on a setting size that is a size of a sheet that is set by a user with the operating panel 32 (the larger a setting size, the longer the predetermined range of periods of time).

If a period of time for which a sheet SH passes the conveyance sensor 52 is within the predetermined range of periods of time, the engine control device 70 determines that a size of the sheet SH corresponds to a size of the sheet that has been set by a user with the operating panel 32. If a period of time for which a sheet SH passes the conveyance sensor 52 is out of a predetermined range of periods of time of each of setting sizes, the engine control device 70 determines that a size of the sheet SH is different from a size of the sheet that has been set by a user with the operating panel 32.

If the engine control device 70 does not detect arrival of a sheet SH at the conveyance sensor 52, or if a period of time for which a sheet SH passes the conveyance sensor 52 exceeds a timeout period, the engine control device 70 determines that the sheet SH jams within the conveyance section 50.

For example, the controller device 60 and the engine control device 70 each include a central processing unit (CPU), a read only memory (ROM), and a random-access memory (RAM). At least part of functions of the controller device 60 may be implemented by the CPU that performs control program stored in the ROM of the controller device 60. Similarly, at least part of functions of the engine control device 70 may be implemented by the CPU that performs control program stored in the ROM of the engine control device 70.

Figure 2:
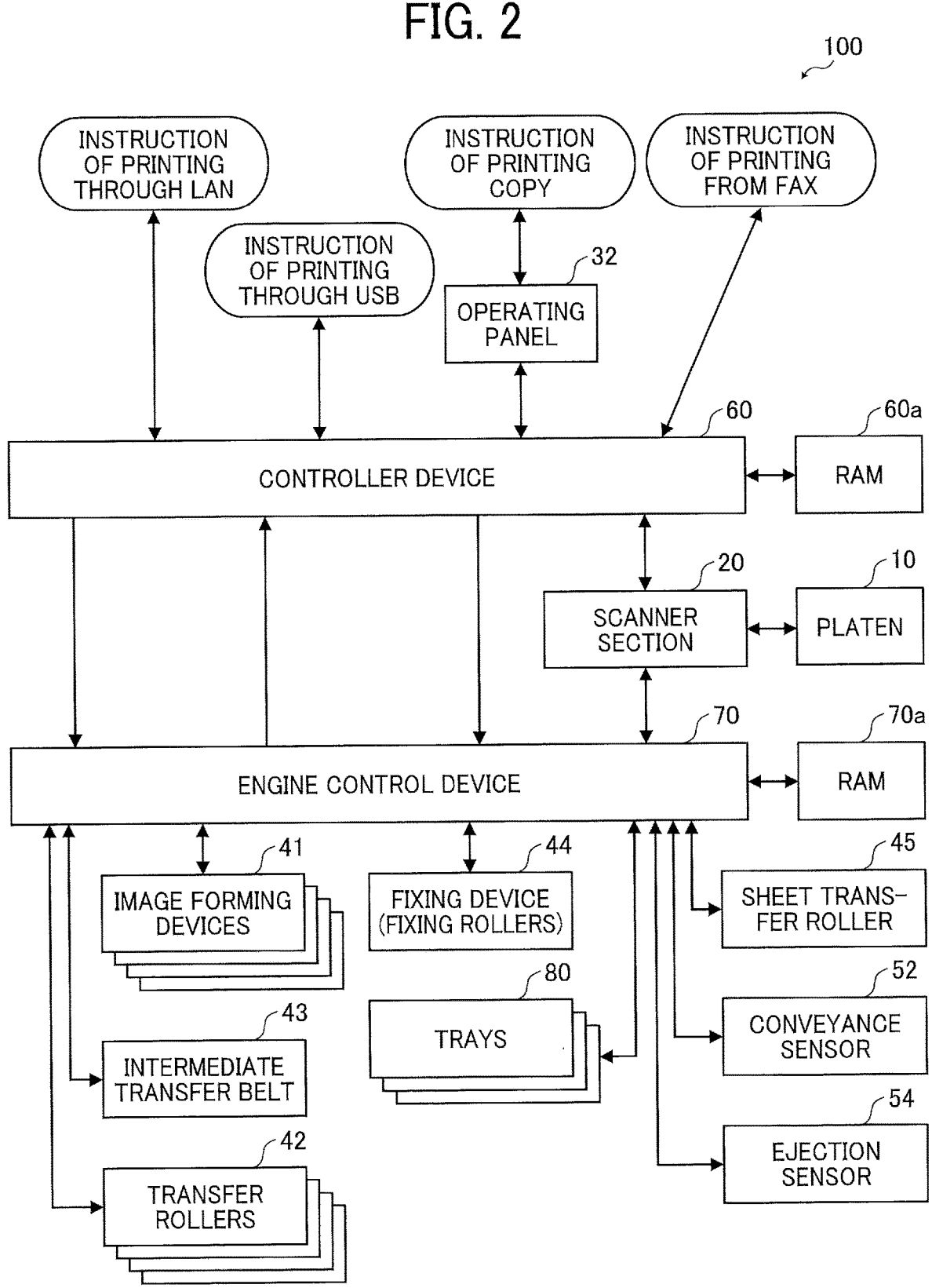
FIG. 2 is a block diagram illustrating an example of a control system of the image forming apparatus in FIG. 1.

FIG. 2 is a block diagram illustrating an example of a control system of the image forming apparatus 100 in FIG. 1.

Based on an instruction of a start of printing the controller device 60 receives from a user through the operating panel 32, the controller device 60 starts control of printing operation. If the controller device 60 receives an instruction of a start of printing, the controller device 60 operates the scanner section 20 to generate image data of an original document MS.

The controller device 60 may start control of printing operation, based on an instruction of a start of printing the controller device 60 receives through a LAN. Alternatively, the controller device 60 may start control of printing operation, based on an instruction of a start of printing the controller device 60 receives through USB. Alternatively, the controller device 60 may start control of printing operation, based on an instruction of a start of printing the controller device 60 receives from a facsimile (fax). The instruction of a start of printing includes information, such as a number of copies to print, a size of a sheet (one of the trays 80 to be used), and selection of single-sided printing or double-sided printing (hereinafter, the information will be referred to as setting information). The instruction of a start of printing through a LAN and the instruction of a start of printing from a facsimile each include image data, in addition to the setting information.

The controller device 60 assigns a main management number to each of instructions of starts of printing, and assigns a subsidiary management number to each of images to be printed. The controller device 60 stores a main management number in a RAM 60a, and stores printing-mode information in the RAM 60a. The printing-mode information includes subsidiary management numbers, and at least part of setting information and image data that are identified by the subsidiary management numbers. The controller device 60 may include the RAM 60a. The controller device 60 transmits the main management number and the printing-mode information that includes subsidiary management number(s) to the engine control device 70, and thus instructs the engine control device 70 to perform printing. Hereinafter, the main management number and the subsidiary management number(s) may be collectively referred to as a management number if the main management number and the subsidiary management number(s) do not need to be discriminated.

The engine control device 70 receives the printing-mode information from the controller device 60, and stores the printing-mode information in a RAM 70a. The engine control device 70 may include the RAM 70a. Based on the printing-mode information, the engine control device 70 controls the image forming devices 41, the transfer rollers 42, the intermediate transfer belt 43, the fixing device 44, and the sheet transfer roller 45 to print an image(s) on a sheet(s) SH. The engine control device 70 is an example of control circuitry that controls printing of an image(s) on a sheet(s) SH.

The engine control device 70 monitors output from the conveyance sensor 52, and calculates a period of time of passage for which a sheet SH fed from one of the trays 80 passes the conveyance sensor 52, and thus determines a size of the sheet SH. The period of time of passage is a period of time from a time at which a front end of a sheet SH arrives at the conveyance sensor 52 to a time at which a rear end of the sheet SH passes the conveyance sensor 52. Based on the period of time of passage and a speed of conveyance of sheets SH, the engine control device 70 calculates a size of a sheet that is a length of a sheet in a direction of conveyance of sheets SH (vertical direction).

According to the embodiment, one of a plurality of kinds of sheets SH loadable onto the respective trays 80 that has a relatively large size is longer and wider than another sheet SH loadable onto one of the trays 80 that has a relatively small size. Therefore, a size of a sheet is determined based on a length of a sheet SH.

If a calculated size of a sheet corresponds to a setting size that is a size of a sheet included in printing-mode information, the engine control device 70 continues and completes the printing. If a determined size of a sheet does not correspond to a setting size, the engine control device 70 sets an operation mode to MD1 or MD2, based on a number of sheets to be printed for each selection of the start button for printing (printing job). The operation mode MD1 is an example of a first operation mode. The operation mode MD2 is an example of a second operation mode.

For example, if a number of sheets SH to be printed for selection of the start button for printing is one, and a calculated size of the sheet does not correspond to a setting size, an operation mode is set to MD1 (printing is continued, and recovery printing is prohibited). Alternatively, if a number of sheets SH to be printed for selection of the start button for printing is two or more, and a calculated size of one of the sheets does not correspond to a setting size, an operation mode is set to MD2 (printing is stopped, and recovery printing is allowed). That is, a number of times of printing of the operation mode MD2 is larger than a number of times of printing of the operation mode MD1.

According to the operation mode MD1, the engine control device 70 prints an image on a sheet SH whose size does not correspond to a setting size based on determination, and ejects the sheet SH through the ejection port 51. The engine control device 70 also erases a main management number and printing-mode information that includes a subsidiary management number that are stored in the RAM 70a and correspond to the image printed on the sheet SH. Consequently, recovery printing is prohibited.

The engine control device 70 monitors output from the ejection sensor 54. After the engine control device 70 determines that a sheet SH has passed the ejection port 51, the engine control device 70 notifies the controller device 60 of ejection of the sheet SH on which an image data is printed, in addition to a main management number or a subsidiary management number. The engine control device 70 also notifies the controller device 60 of discrepancy between sizes of the sheet. Notification of ejection of a sheet SH and notification of discrepancy between sizes of the sheet may be simultaneously transmitted to the controller device 60.

If the controller device 60 receives notification of ejection of a sheet SH, the controller device 60 determines that printing has been normally completed, and erases printing-mode information that is stored in the RAM 60a and corresponds to the management number the controller device 60 has received, and thus prohibits recovery printing. Further, if the controller device 60 receives notification of discrepancy between sizes of a sheet, the controller device 60 displays a display of an error (a display of discrepancy between sizes of a sheet) on the operating panel 32 to request a user to load appropriate sheets onto the corresponding tray 80 and perform printing again.

If a user is not satisfied with a sheet SH (size of which is different from a setting size) ejected through the ejection port 51, the user opens the platen 10, places the original document MS on the scanner section 20, sets settings for printing again, and performs printing again.

On the other hand, if a user is satisfied with a sheet SH ejected through the ejection port 51, the user may take the sheet SH and leave the image forming apparatus 100. Also in that case, printing-mode information that includes image data is erased from the RAM 60a, based on determination of prohibiting recovery printing. Therefore, unauthorized printing by a person other than a user is prevented. Therefore, security is improved.

On the other hand, according to the operation mode MD2, the engine control device 70 stops operation of conveyance of a sheet SH whose size does not correspond to a setting size based on determination, and keeps the sheet SH in the conveyance section 50. Hereinafter, stopping operation of conveyance of a sheet SH and keeping the sheet SH in the conveyance section 50 will be referred to as a paper jam stop. The engine control device 70 may convey a sheet SH to a place where a user easily removes the sheet SH, and then stop operation of conveyance. For example, the place where a user easily removes a sheet SH is a place at which part of the sheet SH is out of the ejection port 51.

The engine control device 70 may eject at least one sheet SH through the ejection port 51, and then stop operation of conveyance of subsequent sheets SH. Even if one first sheet SH of a plurality of sheets SH that are being printed is ejected, remaining sheets SH are not ejected. Therefore, a user performs recovery printing without leaving the image forming apparatus 100. Since a user performs recovery printing without leaving the image forming apparatus 100, unauthorized printing by a person other than a user is prevented. Therefore, security is maintained.

The engine control device 70 notifies the controller device 60 of a paper jam stop of a sheet SH on which an image data is printed, in addition to a subsidiary management number, for example. Further, the engine control device 70 notifies the controller device 60 of discrepancy between sizes of the sheet. Notification of a paper jam stop and notification of discrepancy between sizes of a sheet may be simultaneously transmitted to the controller device 60.

The controller device 60 displays a display of an error (a display of a paper jam stop) on the operating panel 32 to request a user to remove the sheet SH from the conveyance section 50 or the ejection port 51. The controller device 60 allows recovery printing of image data that corresponds to the subsidiary management number the controller device 60 has received, and allows recovery printing of image data that corresponds to subsidiary management numbers subsequent to the subsidiary management number the controller device 60 has received. Further, the controller device 60 adds recovery information to printing-mode information that is stored in the RAM 60a and corresponds to the management number the controller device 60 has received. The recovery information indicates that recovery printing is allowed.

If the engine control device 70 detects a user's having removed the sheet SH that had stayed in the conveyance section 50, the engine control device 70 notifies the controller device 60 of information that indicates that the sheet SH does not stay in the conveyance section 50. The controller device 60 displays a display that allows selection of whether or not recovery printing will be performed (a display of recovery printing) on the operating panel 32 to allow a user to select whether or not recovery printing will be performed.

If a user selects recovery printing, the controller device 60 reads printing-mode information (that includes a subsidiary management number(s) and image data) that is an object of the recovery printing from the RAM 60a, transmits the printing-mode information to the engine control device 70, and instructs the engine control device 70 to perform recovery printing. The engine control device 70 receives the printing-mode information from the controller device 60, stores the printing-mode information in the RAM 70a, and starts the recovery printing. If the recovery printing is normally completed, the engine control device 70 erases the printing-mode information that is stored in the RAM 70a and is an object of the recovery printing, and the controller device 60 erases the printing-mode information and the image data that are stored in the RAM 60a and are an object of the recovery printing.

FIG. 3 is an illustration illustrating an example of printing-mode information stored in the RAMs 60a and 70a in FIG. 1. The RAMs 60a and 70a each store a main management number (e.g. A), and contents of at least one printing mode, in this order. The contents of at least one printing mode are stored with respective subsidiary management numbers that each include a suffix number (e.g. A-1). The main management number is assigned to each selection of the start button for printing displayed on the operating panel 32 (that is, to each printing job). The subsidiary management number is assigned to each image that is being printed on a sheet SH.

For example, FIG. 3 illustrates information that is stored in each of the RAMs 60a and 70a if a number of copies of one original document MS is set to m (m is an integer equal to or larger than three), and then the start button for printing is selected. Alternatively, FIG. 3 illustrates information that is stored in each of the RAMs 60a and 70a if a number of copies to print is set to one, the start button for printing is selected, and an ADF is used to print m original documents MS. Alternatively, FIG. 3 illustrates information that is stored in each of the RAMs 60a and 70a if a number of copies to print is set to two, the start button for printing is selected, and an ADF is used to print m/2 (m is an even number equal to or larger than four) original documents MS.

The printing modes are stored with the respective subsidiary management numbers in each of the RAMs 60a and 70a. Each of the printing modes includes a setting size that indicates a size of a sheet SH, selection of one of trays 80 that accommodates sheets SH that are being used for printing, and selection of single-sided printing or double-sided printing. For example, the information is set by a user who operates the operating panel 32. Each of the printing modes stored in the RAM 60a also includes image data. Each of the printing modes stored in the RAM 60a may also include recovery information that indicates that recovery printing is allowed. Allowing recovery printing will be described later. FIG. 3 illustrates an example in which image data is not successfully printed that corresponds to a management number A-m stored in the RAM 60a, but recovery printing is possible due to recovery information added to the RAM 60a.

Image data, and contents of printing modes that do not include image data are separately stored in respective sections in the RAM 60a. In that case, a section illustrated as image data in the RAM 60a in FIG. 3 stores an address of a location where the image data is stored.

Figures 4, 5:
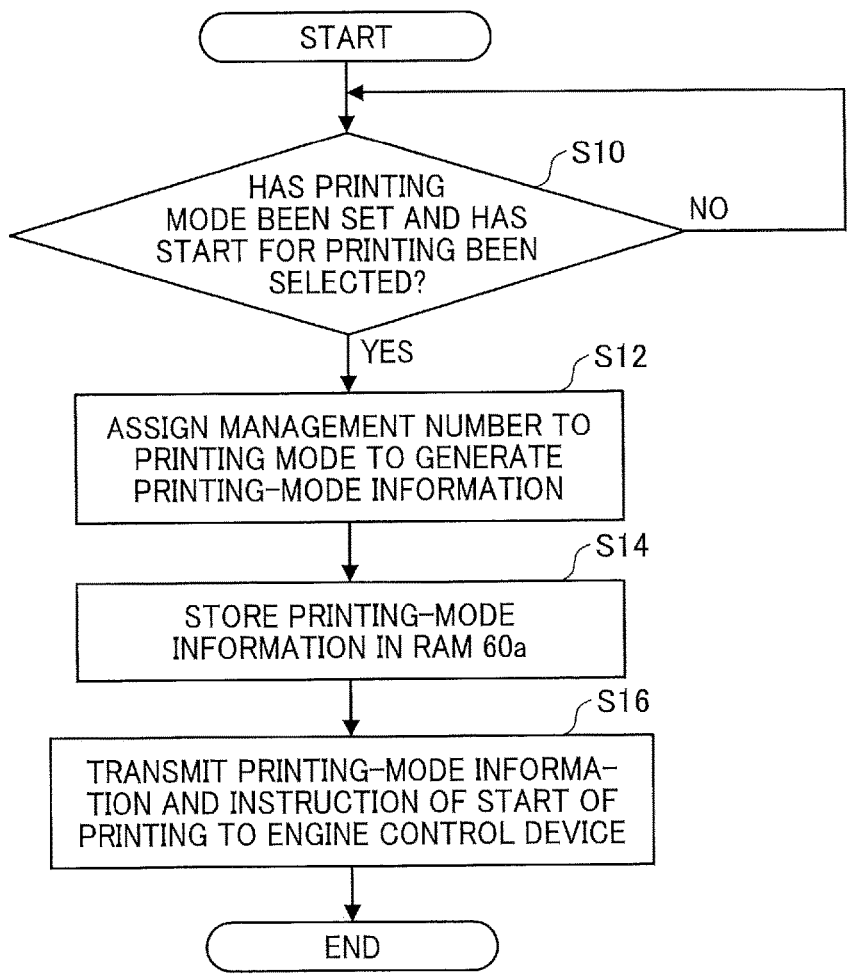
FIG. 4 is an illustration illustrating an example of a way of operation at a time of occurrence of discrepancy between sizes of a sheet.
FIG. 5 is a flowchart illustrating an example of operation of a controller device in FIG. 1.

FIG. 4 is an illustration illustrating an example of a way of operation at a time of occurrence of discrepancy between sizes of a sheet. In the embodiment, if a number of sheets to be printed for each selection of the start button for printing (i.e. each request for printing) is one, the image forming apparatus 100 sets an operation mode to MD1. Alternatively, if a number of sheets to be printed for each selection of the start button for printing is equal to or larger than two, the image forming apparatus 100 sets an operation mode to MD2.

According to the operation mode MD1, a sheet SH is ejected and recovery printing is prohibited at a time of occurrence of discrepancy between sizes of a sheet. According to the operation mode MD2, a sheet SH is not ejected and thus a paper jam stop is caused, and recovery printing is allowed at a time of occurrence of discrepancy between sizes of a sheet. A display of discrepancy between sizes of a sheet is displayed irrespective of whether an operation mode is MD1 or MD2. A number of sheets to be printed for each selection of the start button for printing is determined based on a number of sections of the subsidiary management numbers illustrated in FIG. 3 (a number of suffix numbers).

According to a way of operation 1 illustrated in FIG. 4, a paper jam stop of a sheet SH is not caused but the sheet SH is ejected at a time of occurrence of discrepancy between sizes of the sheet in the operation mode MD1 in which a number of sheets to be printed is few. Consequently, the sheet SH does not need to be removed from the conveyance section 50. A paper jam stop due to discrepancy between sizes of a sheet does not cause damage, such as folds. Therefore, conveyance does not cause paper jam, and a sheet SH is ejected through the ejection port 51.

A number of copies of a secret document, such as a driver's license, is often set to a minimum number. If a copy of a driver's license is submitted to a public office, for example, a user may not be particular about a size of a sheet.

Even if discrepancy between sizes of a sheet occurs, a user often does not print a driver's license again, and takes away the printed sheet SH. Even in that case, recovery printing is prohibited, and thus it is prevented that another user executes unauthorized printing. Therefore, security is improved.

According to the operation mode MD2 in which a number of sheets to be printed for each selection of the start button for printing is larger than a number of sheets to be printed for each selection of the start button for printing of the operation mode MD1, a sheet SH is stopped by a paper jam stop, and recovery printing is allowed at a time of occurrence of discrepancy between sizes of a sheet. Therefore, a plurality of sheets SH that have a wrong size is not allowed to be printed. Consequently, since sheets SH are not wasted, sheets SH prepared by a user do not run out.

If a sheet SH is stopped by a paper jam stop, a user removes the sheet SH that has been stopped within the conveyance section 50, and then uses the operating panel 32 to select whether or not recovery printing is performed. The user does not leave the image forming apparatus 100. Therefore, it is prevented that another user executes unauthorized printing. Therefore, security is improved. Further, the user performs recovery printing without waiting for many sheets SH that each have a wrong size to be printed. Therefore, the user promptly restarts printing, and uses sheets that each have an appropriate size. As described above, sheets are not wastefully printed, and security is improved.

An operation mode may be set to MD1 if a number of copies to print set by a user with the operating panel 32 is one. Alternatively, an operation mode may be set to MD2 if a number of copies to print set by a user with the operating panel 32 is equal to or larger than two. Further, an operation mode may be set to MD1 if a number of copies to print set by a user is two. Alternatively, an operation mode may be set to MD2 if a number of copies to print set by a user is equal to or larger than three. That is, an operation mode may be set to MD1 or MD2, based on a number of copies to print for each one of original documents MS that are being printed.

In that case, the printing-mode information stored in the RAMs 60a and 70a illustrated in FIG. 3 may include a number of copies to print set by a user. The engine control device 70 sets an operation mode to MD1 or MD2, based on a number of copies to print stored in the RAM 70a. In the RAMs 60a and 70a, subsidiary management numbers are assigned to respective images that are being printed. For example, if a number of copies to print is set to one, and m original documents MS are printed with an ADF, "one" is stored in a section of a number of copies to print of each of m subsidiary management numbers. Alternatively, if a number of copies to print is set to m, and one original document MS is printed, "m" is stored in a section of a number of copies to print of each of m subsidiary management numbers.

FIG. 5 is a flowchart illustrating an example of operation of the controller device 60 in FIG. 1. The operation illustrated in FIG. 5 is started when the image forming apparatus 100 is activated. Alternatively, the operation illustrated in FIG. 5 is started when printing ends.

First, in step S10, the controller device 60 monitors whether or not a user has set a printing mode, and has selected a start of printing. The setting of printing mode and the selection of a start of printing are recognized by operation of the operating panel 32 by a user, an instruction of printing by a user through a LAN, or an instruction of printing by a user through USB. If a user has set a printing mode and has selected a start of printing, the controller device 60 allows the process to proceed to step S12.

In step S12, the controller device 60 assigns a subsidiary management number(s) to the printing mode that has been set by the user to generate printing-mode information. If a number of copies to print that has been set is plural, or if a plurality of original documents MS is scanned in order with an ADF, the controller device 60 generates a plurality of pieces of printing-mode information in order.

Next, in step S14, the controller device 60 stores the pieces of printing-mode information that includes image data in the RAM 60a. Next, in step S16, the controller device 60 transmits the plurality of pieces of printing-mode information that includes a main management number and the subsidiary management numbers, in addition to an instruction of a start of printing, to the engine control device 70, and ends the process.

For example, an instruction of a start of printing is performed for each selection of the start button for printing on the operating panel 32. A maximum number of pieces of printing-mode information transmitted to the engine control device 70 depends on a number of copies to print set by a user, and depends on scanning performance of the scanner section 20 that scans original documents MS.

For example, three original documents MS are scanned until the controller device 60 starts to transmit printing-mode information to the engine control device 70. If a number of original documents MS is equal to or smaller than three (the number is referred to as a), and a number of copies to print that has been set is b, a×b pieces of printing-mode information and an instruction of a start of printing are transmitted to the engine control device 70. If a number of original documents MS is equal to or larger than four, and a number of copies to print is b, 3×b pieces of printing-mode information and an instruction of a start of printing are transmitted to the engine control device 70.

If image data the controller device 60 has receives through a LAN or USB is printed, the controller device 60 stores all the image data that has been received by the controller device 60 and corresponds to selection of the start button for printing, in addition to printing-mode information, in the RAM 60a. Then the controller device 60 transmits all the printing-mode information that corresponds to the selection of the start button for printing, in addition to an instruction of a start of printing, to the engine control device 70.

Figure 6:
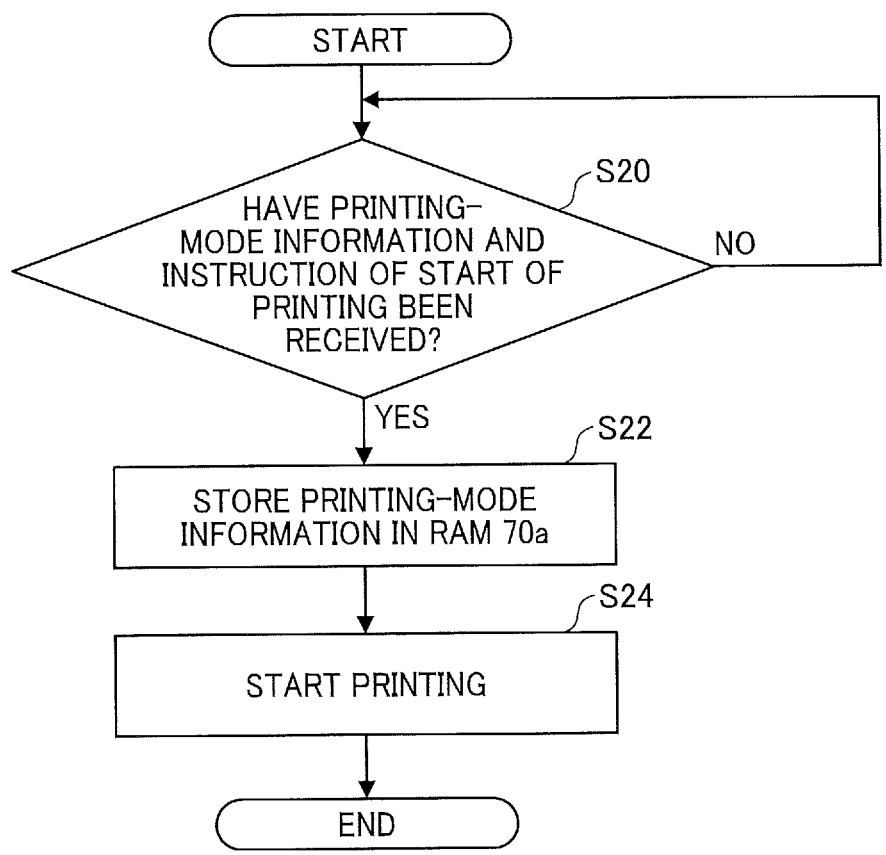
FIG. 6 is a flowchart illustrating an example of operation of an engine control device in FIG. 1.

FIG. 6 is a flowchart illustrating an example of operation of the engine control device 70 in FIG. 1. The operation illustrated in FIG. 6 is started when the image forming apparatus 100 is activated. Alternatively, the operation illustrated in FIG. 6 is started when printing ends.

First, in step S20, the engine control device 70 monitors whether or not the engine control device 70 has received at least one piece of printing-mode information, in addition to an instruction of a start of printing, from the controller device 60. If the engine control device 70 has received printing-mode information and an instruction of a start of printing, the engine control device 70 allow the process to proceed to step S22.

In step S22, the engine control device 70 stores part of the printing-mode information (that includes subsidiary management numbers) the engine control device 70 has received in the RAM 70a. The part of the printing-mode information does not include image data. Next, in step S24, the engine control device 70 starts printing, based on the printing-mode information, and ends the process.

Figure 7:
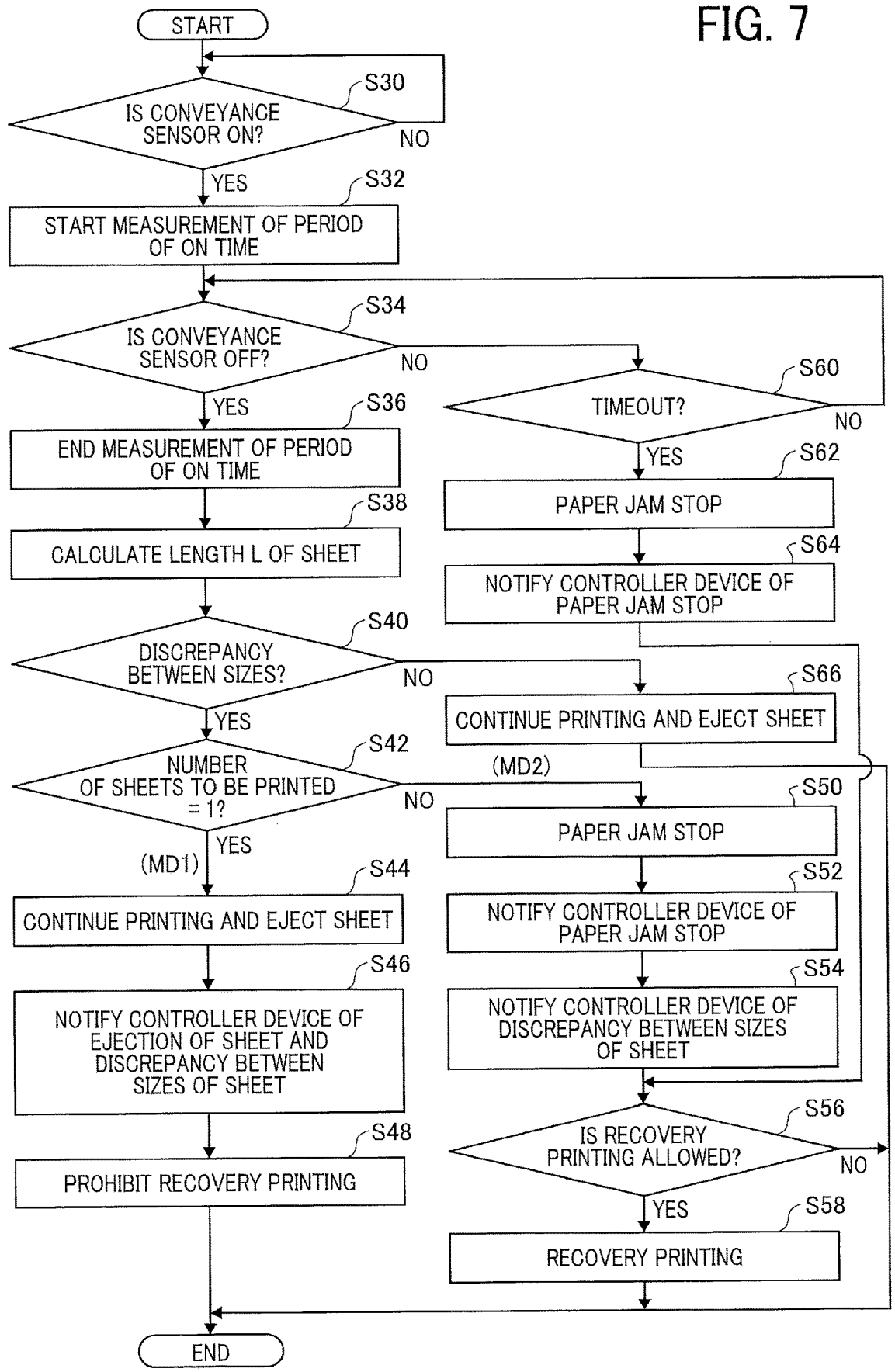
FIG. 7 is a flowchart illustrating an example of operation in step S24 in FIG. 6.

FIG. 7 is a flowchart illustrating an example of operation in step S24 in FIG. 6. For example, operation in FIG. 7 is started based on a start of conveyance of a sheet SH from one of the trays 80.

First, in step S30, the engine control device 70 monitors whether output from the conveyance sensor 52 is ON or OFF. If the engine control device 70 detects arrival of a sheet SH that has been picked up from one of the trays 80 at the conveyance sensor 52, the engine control device 70 allows the process to proceed to step S32. The conveyance sensor 52 outputs ON information when a sheet SH blocks a sensor. Alternatively, the conveyance sensor 52 outputs OFF information when a sheet SH does not block the sensor.

In step S32, the engine control device 70 starts measurement of a period of ON time for which the conveyance sensor 52 outputs the ON information, and allows the process to proceed to step S34. In step S34, the engine control device 70 monitors whether output from the conveyance sensor 52 is ON or OFF. If the output becomes OFF, the engine control device 70 allows the process to proceed to step S36. Alternatively, if the output remains ON, the engine control device 70 allows the process to proceed to step S60.

In step S36, the engine control device 70 ends the measurement of the period of time for which the conveyance sensor 52 outputs the ON information, and allows the process to proceed to step S38. In step S38, based on the period of time for which the conveyance sensor 52 outputs the ON information, and a speed of conveyance of sheets SH, the engine control device 70 calculates a length L of the sheet that is a length in a direction of conveyance of the sheet SH (e.g. a vertical direction), and allows the process to proceed to step S40.

In step S40, the engine control device 70 compares the length L of the sheet calculated in step S38 with a length A of a sheet that corresponds to a setting size included in the printing-mode information stored in the RAM 70a. If the length L of the sheet is equal to or longer than the length A of a sheet+α, or if the length L of the sheet is equal to or shorter than the length A of a sheet−β, the engine control device 70 detects discrepancy between the sizes of the sheet, and allows the process to proceed to step S42. α is not particularly limited but is approximately 20% of the length A of a sheet. β is not particularly limited but is approximately 10% of the length A of a sheet. α and β may be constant irrespective of a size of a sheet, or may become larger as a size of a sheet becomes larger.

The engine control device 70 may omit step S38, and uses the measured period of ON time as a length L of the sheet. In that case, if the period of ON time is out of a predetermined range of periods of time in step S40, the engine control device 70 detects discrepancy between sizes of a sheet. Alternatively, if the period of ON time is within the predetermined range of periods of time in step S40, the engine control device 70 detects correspondence between sizes of a sheet. As described above, the predetermined range of periods of time may be changed based on a setting size that is a size of a sheet that is set by a user with the operating panel 32.

In step S42, the engine control device 70 determines whether or not a number of sheets to be printed is one, based on the printing-mode information stored in the RAM 70a. The number of sheets to be printed is a number of times of printing on sheets SH for selection of the start button for printing. For example, if only one subsidiary management number is stored in the RAM 70a, the engine control device 70 determines that a number of sheets to be printed is one.

Alternatively, if a plurality of subsidiary management numbers is stored in the RAM 70a, the engine control device 70 determines that a number of sheets to be printed is plural. If a number of sheets to be printed is one, the engine control device 70 determines that an operation mode is MD1, and allows the process to proceed to step S44. If a number of sheets to be printed is equal to or larger than two, the engine control device 70 determines that an operation mode is MD2, and allows the process to proceed to step S50.

The engine control device 70 may determine whether an operation mode is MD1 or MD2, based on a number of copies to print set by a user. In that case, if a number of copies to print in the printing-mode information stored in the RAM 70a is one, the engine control device 70 determines that an operation mode is MD1. Alternatively, if a number of copies to print in the printing-mode information stored in the RAM 70a is equal to or larger than two, the engine control device 70 determines that an operation mode is MD2.

In step S44, the engine control device 70 continues the printing, ejects a sheet SH on which an image is printed through the ejection port 51, and allows the process to proceed to step S46. In step S46, the engine control device 70 notifies the controller device 60 of the ejection of the sheet SH on which an image is printed, and discrepancy between sizes of the sheet, and allows the process to proceed to step S48. The controller device 60 receives the notification, and displays a display of an error that illustrates discrepancy between sizes of the sheet (display of discrepancy between sizes of the sheet) on the operating panel 32.

In step S48, the engine control device 70 prohibits recovery printing, erases the printing-mode information that is stored in the RAM 70a and is an object of the printing, and ends the process. If a number of sheets to be printed for each selection of the start button for printing is one, and discrepancy between sizes of a sheet is detected, recovery printing is prohibited, and thus it is prevented that another user executes unauthorized printing even if the one user takes away a sheet SH that has been printed and ejected. Consequently, security is improved.

On the other hand, if a number of sheets SH to be printed for selection of the start button for printing is equal to or larger than two, the engine control device 70 stops operation of conveyance of a sheet SH and thus keeps the sheet SH within the conveyance section 50 (a paper jam stop) in step S50, and allows the process to proceed to step S52.

In step S52, the engine control device 70 notifies the controller device 60 of the paper jam stop. The controller device 60 receives the notification, and displays a display of an error (a display of a paper jam stop) on the operating panel 32 to request a user to remove the sheet SH from the conveyance section 50.

Next, in step S54, the engine control device 70 detects removal of the sheet SH that has been stopped by the paper jam stop from the conveyance section 50 by means of the conveyance sensor 52, and then notifies the controller device 60 of information that indicates discrepancy between sizes of the sheet. The controller device 60 receives the notification, and displays a display of an error that indicates the discrepancy between sizes of the sheet (display of discrepancy between sizes of the sheet) on the operating panel 32. Then the controller device 60 controls recovery printing.

Next, if the engine control device 70 receives an instruction of recovery printing from the controller device 60 in step S56, the engine control device 70 allows the process to proceed to step S58. Alternatively, if the engine control device 70 does not receive an instruction of recovery printing from the controller device 60 in step S56, the engine control device 70 ends the process. In step S58, the engine control device 70 stores part of the printing-mode information the engine control device 70 receives from the controller device 60 in the RAM 70*a*. The part of the printing-mode information does not include image data. Further, the engine control device 70 uses the image data the engine control device 70 receives from the controller device 60 to perform recovery printing, and ends the process. After the recovery printing ends, the engine control device 70 erases the printing-mode information that is stored in the RAM 70*a* and is used for recovery printing.

In step S60, if the period of ON time exceeds a predetermined timeout period, the engine control device 70 allows the process to proceed to step S62. Alternatively, if a period of ON time does not exceed the timeout period, the engine control device 70 returns the process to step S34 to continue measurement of the period of ON time.

In step S62, the engine control device 70 determines that paper jam occurs in conveyance of a sheet SH, stops operation of conveyance of the sheet SH (a paper jam stop), and allows the process to proceed to step S64. In step S64, the engine control device 70 notifies the controller device 60 of the paper jam stop, similarly to step S52, and displays a display of an error (a display of a paper jam stop) on the operating panel 32 to request a user to remove the sheet SH from the conveyance section 50.

Further, if the engine control device 70 detects removal of the sheet SH that has been stopped by the paper jam stop from the conveyance section 50 by means of the conveyance sensor 52, the engine control device 70 notifies the controller device 60 of cancellation of the paper jam stop, and allows the process to proceed to step S56. The controller device 60 receives the notification of cancellation of the paper jam stop and controls recovery printing.

On the other hand, if a size of a sheet SH corresponds to a setting size in step S40, the engine control device 70 continues the printing, ejects the sheet SH on which an image is printed through the ejection port 51, and ends the process, in step S66. That is, normal printing operation is performed. The engine control device 70 erases the printing-mode information that is stored in the RAM 70*a* and corresponds to the image printed on the sheet SH.

Figure 8:
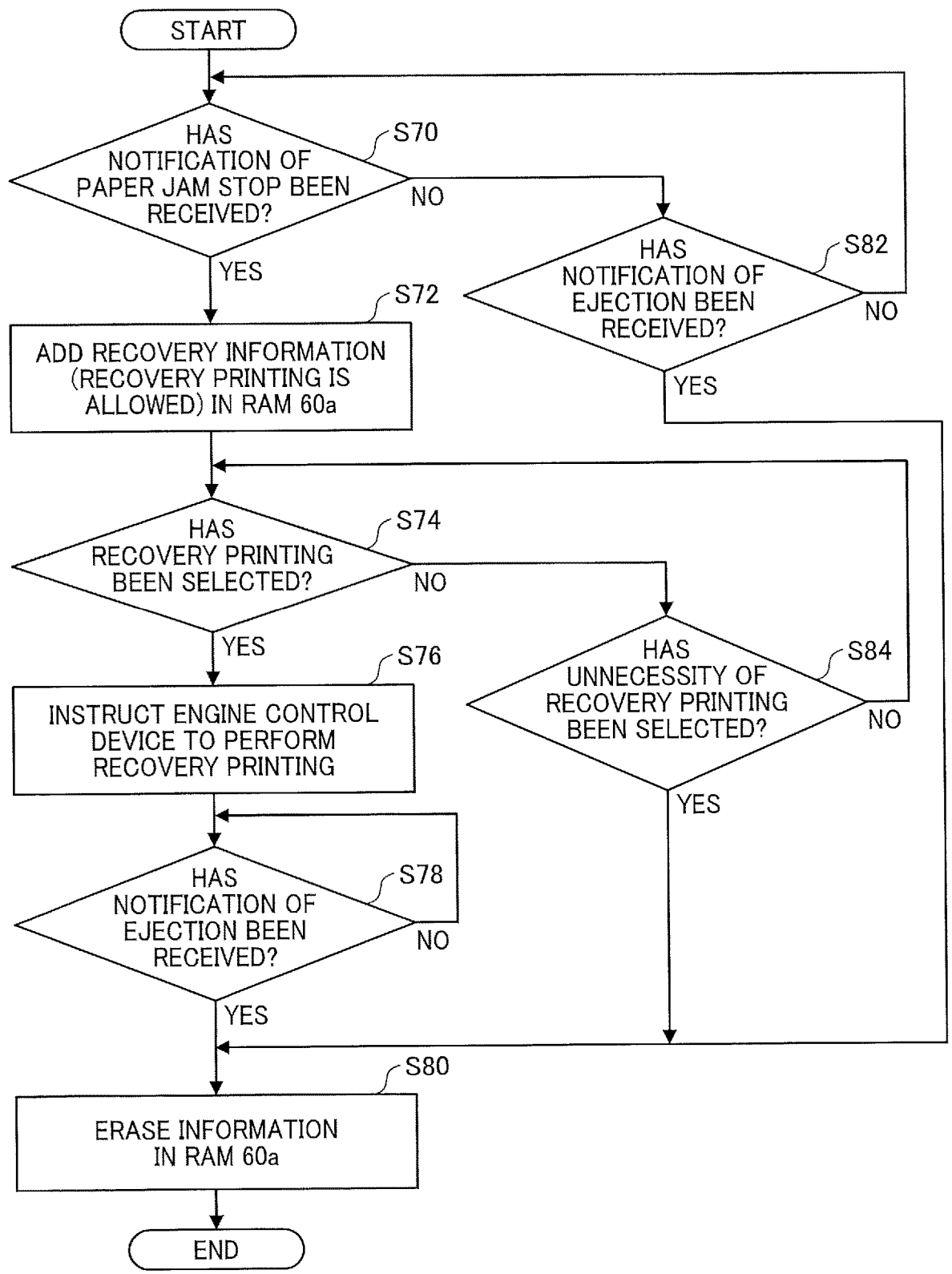
FIG. 8 is a flowchart illustrating an example of control of recovery printing by the controller device in FIG. 1.
Figure 10A:
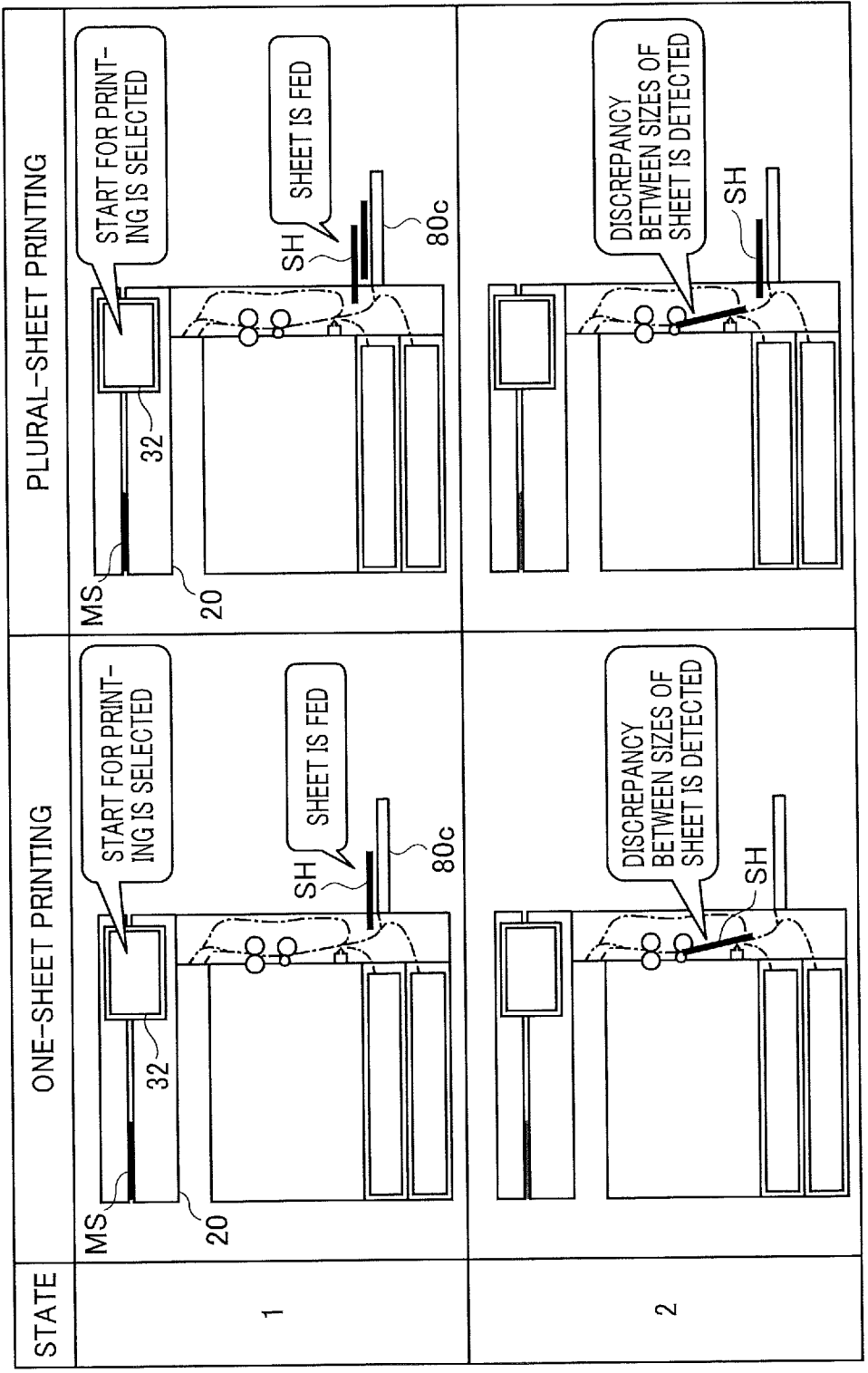

FIG. 8 is a flowchart illustrating an example of control of recovery printing by the controller device 60 in FIG. 1. For example, operation illustrated in FIG. 8 is started after step S16 illustrated in FIG. 5.

First, if the controller device 60 receives a notification of a paper jam stop from the engine control device 70 in step S70, the controller device 60 allows the process to proceed to step S72. Alternatively, if the controller device 60 does not receive a notification of a paper jam stop from the engine control device 70 in step S70, the controller device 60 allows the process to proceed to step S82. The notification of a paper jam stop includes a subsidiary management number included in the printing-mode information (information on the number of the sheet SH that has been stopped by the paper jam stop).

In step S72, the controller device 60 adds recovery information to printing-mode information that is stored in the RAM 60*a* and corresponds to a subsidiary management number included in the notification of the paper jam stop, and allows the process to proceed to step S74. The recovery information indicates that recovery printing is allowed.

For example, the notification of the paper jam stop in step S70 the engine control device 70 transmits to the controller device 60 includes a subsidiary management number of a printing job that corresponds to a sheet SH that has been stopped by the paper jam stop, and subsidiary management numbers of the printing job that are subsequent to the subsidiary management number of the printing job that corresponds to a sheet SH that has been stopped by the paper jam stop. In that case, an object of the recovery printing is an image that is being printed on a sheet SH that has been stopped by the paper jam stop, and images that are being printed on sheets SH that are subsequent to the sheet SH that has been stopped by the paper jam stop. Alternatively, the notification of the paper jam stop in step S70 the engine control device 70 transmits to the controller device 60 includes a main management number that corresponds to the printing job. In that case, an object of the recovery printing is all images included in the printing job.

In step S74, the controller device 60 allows the operating panel 32 to display a display that allows a user to select whether or not recovery printing is performed, and determines whether or not the user selects the recovery printing. If the recovery printing is selected, the controller device 60 allows the process to proceed to step S76. Alternatively, if the recovery printing is not selected, the controller device 60 allows the process to proceed to step S84.

In step S76, the controller device 60 transmits information on an object of recovery printing that is printing-mode information to which the recovery information is added (the printing-mode information includes image data) to the engine control device 70 to instruct the engine control device 70 to perform the recovery printing, and allows the process to proceed to step S78. A plurality of pieces of printing-mode information as information on an object of recovery printing may be transmitted to the engine control device 70. The engine control device 70 receives the instruction of recovery printing, and performs the recovery printing.

In step S78, the controller device 60 waits for receipt of a notification of ejection of a sheet SH that indicates completion of the recovery printing. If the controller device 60 receives the notification of ejection from the engine control device 70, the controller device 60 allows the process to proceed to step S80. In step S80, the controller device 60 erases printing-mode information that has been stored in the RAM 60*a* and corresponds to a main management number that indicates a printing job for which recovery printing is performed, and ends the process. Steps S78 and S80 may be performed for each printing-mode information that is an object of recovery printing.

On the other hand, if the controller device 60 receives a notification of ejection from the engine control device 70 in step S82, the controller device 60 determines that printing is normally completed, and ends the process. Alternatively, if the controller device 60 does not receive a notification of ejection from the engine control device 70, the controller device 60 returns the process to step S70.

In step S84, if a user selects unnecessity of recovery printing, the controller device 60 ends the process. Alternatively, if a user does not select unnecessity of recovery printing, the controller device 60 returns the process to step S74.

FIGS. 9A to 9C are illustrations illustrating examples of displays the operating panel 32 in FIG. 1 displays.

If the controller device 60 receives a notification of a paper jam stop (paper jam) of a sheet SH from the engine control device 70, the controller device 60 displays a display of a paper jam stop illustrated in FIG. 9A on the operating panel 32. In FIG. 9A, the operating panel 32 displays an image that includes a message that notifies that paper jam has occurred, and a message that requests removal of a sheet SH from the conveyance section 50.

If the controller device 60 receives a notification of discrepancy between sizes of a sheet from the engine control device 70, the controller device 60 displays a display of discrepancy between sizes of a sheet illustrated in FIG. 9B on the operating panel 32. In FIG. 9B, the operating panel 32 displays an image that includes a name of one of the trays 80 selected by a user (the bypass tray in the example), and a setting size (A5 size in the example). Further, the operating panel 32 displays an image that includes a message that requests a check for an orientation of a sheet SH and a size of a sheet SH.

After the controller device 60 receives a notification of cancellation of a paper jam stop from the engine control device 70, the controller device 60 displays a display of recovery printing illustrated in FIG. 9C on the operating panel 32. In FIG. 9C, the operating panel 32 displays an image that includes a message that allows a user to select whether or not recovery printing is performed.

FIGS. 10A, 10B, 11A, 11B, 12A, and 12B are diagrams of general operation at a time of occurrence of discrepancy between sizes of a sheet in the image forming apparatus 100 in FIG. 1. FIGS. 10A to 12B illustrate examples where the bypass tray 80c is selected, and an image is printed on a sheet SH fed from the bypass tray 80c.

Left sides of FIGS. 10A to 12B illustrate examples of operation in a case where a number of sheets to be printed for each selection of the start button for printing is set to one. Right sides of FIGS. 10A to 12B illustrate examples of operation in a case where a number of sheets to be printed for each selection of the start button for printing is set to two or larger (e.g. two). Hereinafter, the operation in a case where a number of sheets to be printed for each selection of the start button for printing is set to one is referred to as one-sheet printing, and the operation in a case where a number of sheets to be printed for each selection of the start button for printing is set to two or larger is referred to as plural-sheet printing.

In state 1, a user places an original document MS on the scanner section 20. Then the user selects the start button for printing, and a sheet SH is fed from the bypass tray 80c. A size of sheets SH loaded onto the bypass tray 80c is different from a setting size set with the operating panel 32.

Next, in state 2, discrepancy between sizes of a sheet is detected. In a case of the plural-sheet printing, when discrepancy between sizes of a first sheet SH is detected, a second sheet SH has started to be fed.

Next, in state 3 in a case of the one-sheet printing, a sheet SH is ejected from the conveyance section 50, and the operating panel 32 displays a display of discrepancy between sizes of a sheet. In a case of the plural-sheet printing, the first sheet SH and the second sheet SH are stopped within the conveyance section 50 (paper jam stop), and the operating panel 32 displays a display of a paper jam stop. In a case of the plural-sheet printing, a sheet SH may be conveyed to a place where the sheet SH is easily removed, and then conveyance of the sheet SH may be stopped, as illustrated in state 3' instead of state 3. The place where a sheet SH is easily removed is the ejection port 51, for example.

Figure 11A:
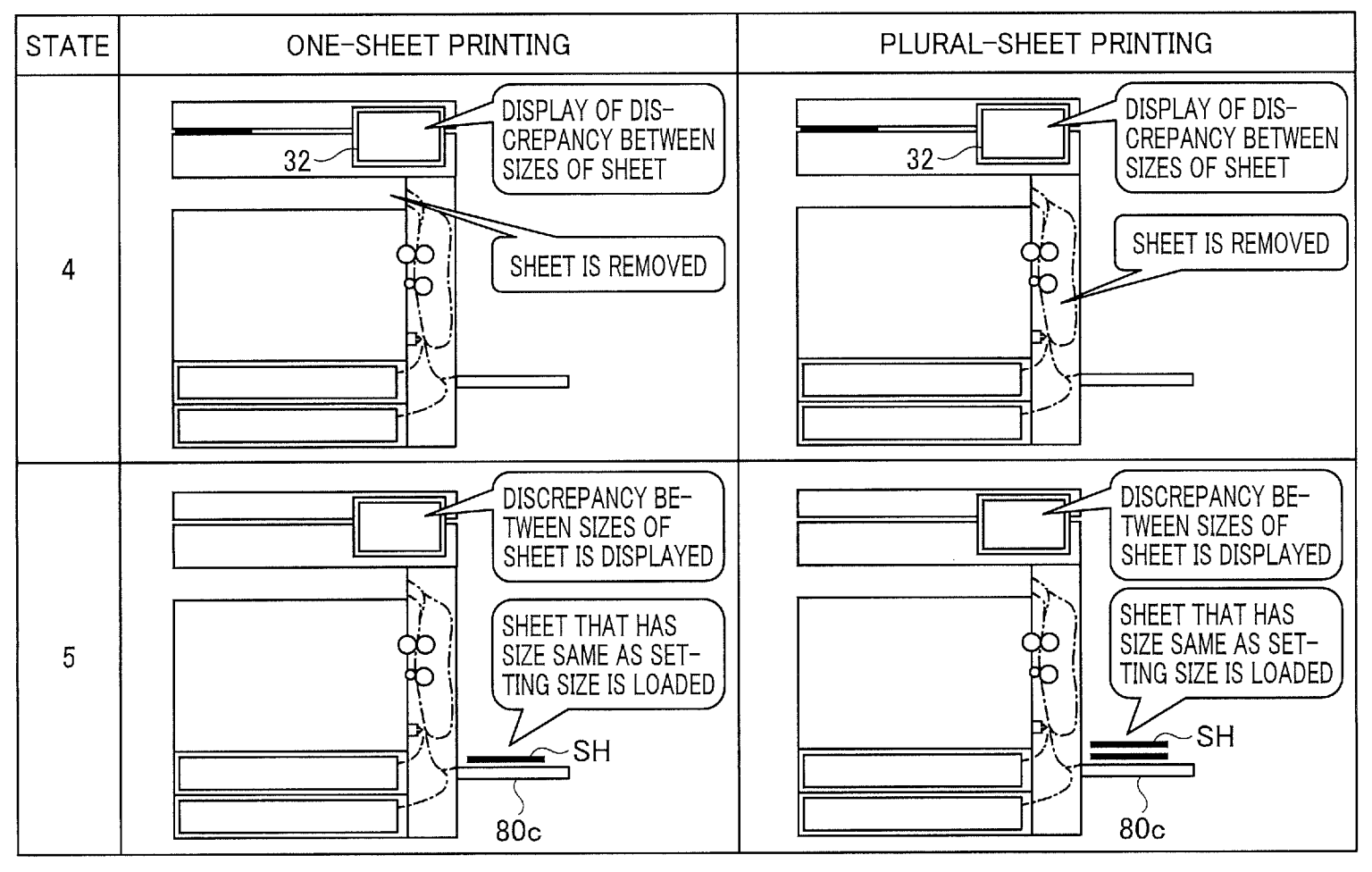

Next, in state 4 illustrated in FIG. 11A in a case of the one-sheet printing, the operating panel 32 continues to display a display of discrepancy between sizes of a sheet. In a case of the plural-sheet printing, the operating panel 32 displays a display of discrepancy between sizes of a sheet after a user watches a display of a paper jam stop and then removes the sheet SH.

Next, in state 5, the user loads sheets SH that have the same size as the setting size onto the bypass tray 80c. Next, in state 6, the user selects "OK" in the display of discrepancy between sizes of a sheet.

Next, in state 7 in a case of the one-sheet printing, the user places an original document MS on the scanner section 20, and sets a size of a sheet. In a case of the plural-sheet printing, the user selects recovery printing in a display of recovery printing displayed on the operating panel 32.

Figure 12A:
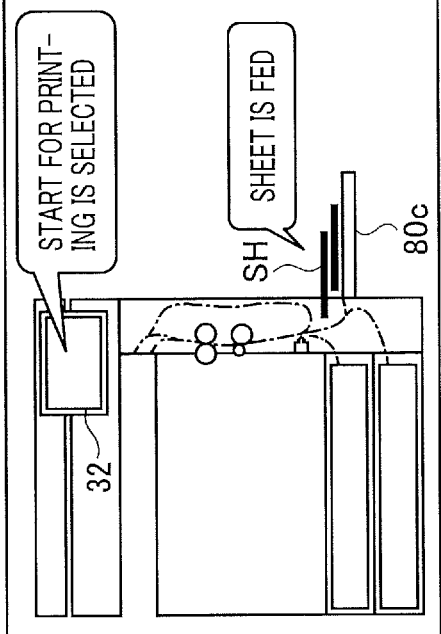

Next, in state 8 in FIG. 12A, the user selects a start of printing in a display on the operating panel 32. Consequently, a sheet SH that has an appropriate size is fed from the bypass tray 80c. Next, in state 9, correspondence between sizes of the sheet is detected, and an image is printed on the sheet SH. A number of sheets SH printed in order in a case of the plural-sheet printing is a number of sheets SH to be printed that has been set. Then, in state 10, the sheet(s) SH on each of which an image is printed is/are ejected from the conveyance section 50, and the printing operation ends.

As described above, according to the embodiment illustrated in FIGS. 1 to 12, if discrepancy between sizes of a sheet is detected in a case of the one-sheet printing, a printed sheet SH is ejected, and recovery printing is prohibited. Consequently, even if a user takes away a sheet that has been ejected, a person who is not the user is not allowed to perform recovery printing. Therefore, unauthorized printing by a person other than a user is prevented. Therefore, security is improved. Therefore, security is improved.

If discrepancy between sizes of a sheet is detected in a case of the plural-sheet printing, conveyance of a printed sheet SH is stopped, and recovery printing is allowed. Consequently, images are not allowed to be printed on a plurality of sheets SH that have a wrong size. Further, the user performs recovery printing without waiting for many sheets SH that each have a wrong size to be printed. Therefore, the user promptly restarts printing, and uses sheets that each have an appropriate size. Further, a fact that a printed sheet is not ejected allows the user to recognize paper jam of the sheet, remove the sheet SH from the conveyance section 50, and perform recovery printing. Therefore, a person who is not the user is not allowed to perform recovery printing.

Consequently, if discrepancy between sizes of a sheet is detected, sheets are not wastefully printed, and security is improved.

If discrepancy between sizes of a sheet is detected in a case of the one-sheet printing, a printed sheet SH is ejected. Therefore, a period of time is not needed to remove a sheet SH from the conveyance section 50. Therefore, efficiency of printing is improved. Further, if discrepancy between sizes of a sheet is detected in a case of the plural-sheet printing, a sheet SH is conveyed to a place where the sheet SH is easily removed. Therefore, a period of time is not needed to remove a sheet SH from the conveyance section 50. Therefore, efficiency of printing is improved.

FIGS. 13A to 13D are tables of examples of ways of operation at a time of occurrence of discrepancy between sizes of a sheet in an image forming apparatus according to another embodiment of the present invention. A configuration of the image forming apparatus according to the embodiment is the same as the image forming apparatus 100 illustrated in FIGS. 1 and 2, except differences in ways of operation at a time of occurrence of discrepancy between sizes of a sheet. The image forming apparatus according to the embodiment is referred to as an image forming apparatus 200 to distinguish between the image forming apparatus according to the embodiment and the image forming apparatus 100 in FIG. 1.

Operation of the image forming apparatus 200 is the same as the operation illustrated in FIGS. 5, 6, 7, and 8, except different determination conditions for operation modes MD1 and MD2. An example of printing-mode information stored in RAMs 60*a* and 70*a* in FIG. 2 is the same as an example of printing-mode information stored in RAMs 60*a* and 70*a* in FIG. 3.

For example, a way of operation is sets to any one of four ways of operation 2 to 5 before shipment of the image forming apparatus 200. A way of operation in each of the operation modes MD1 and MD2 based on which a sheet SH is ejected or is stopped by a paper jam stop is the same as a way of operation in each of the operation modes MD1 and MD2 in FIG. 4 based on which a sheet SH is ejected or is stopped by a paper jam stop. Further, a way of operation in each of the operation modes MD1 and MD2 based on which recovery printing is prohibited or allowed is the same as a way of operation in each of the operation modes MD1 and MD2 in FIG. 4 based on which recovery printing is prohibited or allowed.

That is, according to the operation mode MD1, a sheet SH is ejected and recovery printing is prohibited at a time of occurrence of discrepancy between sizes of a sheet. According to the operation mode MD2, a sheet SH is not ejected and thus a paper jam stop is caused, and recovery printing is allowed at a time of occurrence of discrepancy between sizes of a sheet. A display of occurrence of discrepancy between sizes of a sheet is displayed irrespective of whether an operation mode is MD1 or MD2.

According to the way of operation 2, the image forming apparatus 200 sets an operation mode to MD1 if a number of sheets to be printed for each selection of a start button for printing (i.e. for each printing job) is equal to or smaller than n (n is an integer that is equal to or larger than two). Alternatively, the image forming apparatus 200 sets an operation mode to MD2 if a number of sheets to be printed for each selection of the start button for printing is equal to or larger than n+1.

According to the way of operation 3, the image forming apparatus 200 sets an operation mode to MD1 if a number of sheets to be printed for each selection of the start button for printing is equal to or smaller than m (m is an integer that is equal to or larger than one), and single-sided printing is selected, and a particular tray 80 that is predetermined is selected. Further, if settings do not satisfy conditions for the operation mode MD1, the image forming apparatus 200 sets an operation mode to MD2. For example, if a number of sheets to be printed for each selection of the start button for printing is equal to or larger than m+1, or double-sided printing is selected, or a bypass tray 80*c* is not selected and a tray 80*a* or 80*b* is selected, an operation mode is set to MD2 irrespective of other conditions.

For example, only one side of a secret document, such as a driver's license, is often copied. Alternatively, a particular tray 80 is often selected to copy a secret document, such as a driver's license. A number of copies of a secret document is often set to a minimum number. If discrepancy between sizes of a sheet is detected under such conditions (MD1), a sheet SH on which an image is printed is ejected, and recovery printing is prohibited. Consequently, it is prevented that other user executes unauthorized printing. Therefore, security is improved.

On the other hand, if conditions for the operation mode MD1 are not satisfied (i.e. an operation mode MD2), a sheet SH is stopped by a paper jam stop and recovery printing is allowed at a time of occurrence of discrepancy between sizes of a sheet, a plurality of sheets SH that have a wrong size is not allowed to be printed. Consequently, since sheets SH are not wasted, sheets prepared by a user do not run out. Consequently, sheets are not wastefully printed, and security is improved.

According to the way of operation 4, the image forming apparatus 200 sets an operation mode to MD1 if a number of sheets to be printed for each selection of the start button for printing is equal to or smaller than m (m is an integer that is equal to or larger than one), and single-sided printing is selected, and the bypass tray 80*c* is selected. Further, if setting conditions for the operation mode MD1 are not satisfied, the image forming apparatus 200 sets an operation mode to MD2.

For example, only one side of a secret document, such as a driver's license, is often copied using the bypass tray 80*c*. A number of copies of a secret document is often set to a minimum number. Therefore, at a time of occurrence of discrepancy between sizes of a sheet, sheets are not wastefully printed, and security is improved, similarly to operation according to the way of operation 3.

In the way of operation 5, a condition is added to the setting conditions of the way of operation 4. The added condition is used to determine whether or not, if discrepancy between sizes of a sheet occurs and a sheet SH on which an image is printed is ejected, an image can be printed on the sheet SH that has a wrong size. If an image cannot be printed on a sheet SH that has a wrong size, recovery printing is prohibited (MD1). Alternatively, if an image can be printed on a sheet SH that has a wrong size, recovery printing is allowed (MD1').

For example, according to the way of operation 5, the image forming apparatus 200 sets an operation mode to MD1 or MD1' if a number of sheets to be printed for each selection of the start button for printing is equal to or smaller than m, and single-sided printing is selected, and the bypass tray 80*c* is selected. m is an integer equal to or larger than one. The image forming apparatus 200 sets an operation mode to MD2 if a number of sheets to be printed for each selection of the start button for printing is equal to or larger than m+1.

If a setting size of a sheet that has been set with the operating panel 32 is smaller than a size of a sheet SH fed from one of the trays 80, a whole image generated by a printer section 40 can be printed on the sheet SH. That is, a sheet SH has a size that is different from a size the user has set, but a user obtains the sheet SH on which an image the user expects is printed. Therefore, the user may take the printed sheet SH and leave the image forming apparatus 200. In that case, an operation mode is set to MD1. In the operation mode MD1, a sheet SH on which an image is printed is ejected, and recovery printing is prohibited.

Consequently, if discrepancy between sizes of a sheet is detected, a sheet SH on which an image is printed is ejected, and recovery printing is prohibited, similarly to other operation modes MD1 to MD4. Consequently, it is prevented that other user executes unauthorized printing. Therefore, security is improved.

On the other hand, if a setting size of a sheet exceeds a size of a sheet SH fed from one of the trays 80, a whole image generated by the printer section 40 may not be printed on the sheet SH. In that case, an image a user expects is not printed on a sheet SH ejected through the ejection port 51.

Therefore, an operation mode is set to MD1' in which recovery printing is allowed. A difference between operation modes MD1 and MD1' is simply whether recovery printing is prohibited or allowed.

According to operation mode MD1', if an image a user expects is not printed on a sheet SH that has been ejected, a user can print the image again (recovery printing). Since a sheet SH on which an image is printed is ejected and recovery printing is allowed, a user easily print the image again on a sheet that has an appropriate size.

In the way of operation 3, setting conditions for an operation mode MD1 may be "a number of sheets to be printed for each selection of the start button for printing is equal to or smaller than m, and single-sided printing is selected", or "a number of sheets to be printed for each selection of the start button for printing is equal to or smaller than m, and a particular sheet feed tray is selected". In the way of operation 4, setting conditions for an operation mode MD1 may be "a number of sheets to be printed for each selection of the start button for printing is equal to or smaller than m, and the bypass tray is selected".

In the way of operation 5, setting conditions that are used to determine whether an operation mode is MD1 or MD2 may be the setting conditions of the way of operation 1 (FIG. 4), the setting conditions of the way of operation 2, or the setting conditions of the way of operation 3, except comparison between sizes of a sheet. In the way of operation 5, setting conditions that are used to determine whether an operation mode is MD1 or MD2 may be "a number of sheets to be printed for each selection of the start button for printing is equal to or smaller than m, and single-sided printing is selected", "a number of sheets to be printed for each selection of the start button for printing is equal to or smaller than m, and a particular sheet feed tray is selected", or "a number of sheets to be printed for each selection of the start button for printing is equal to or smaller than m, and the bypass tray is selected", except comparison between sizes of a sheet.

In each of the ways of operation 2 to 5, general operation of the image forming apparatus 200 is the same as general operation in FIGS. 10A to 12B, except a difference in a number of sheets to be printed for each selection of the start button for printing. In the way of operation 4, if "m" is "two", a number of sheets to be printed for each selection of the start button for printing is one or two, the bypass tray is selected, and single-sided printing is selected, for example (an operation mode MD1), two sheets on which respective images are printed are ejected at a time of occurrence of discrepancy between sizes of a sheet. At that time, recovery printing is prohibited. Alternatively, if "m" is "two" and a number of sheets to be printed for each selection of the start button for printing is equal to or larger than three, or if double-sided printing is selected, or if the sheet feed tray 80a or 80b is selected, an operation mode is set to MD2 irrespective of other conditions.

The number n or m that is a condition of an operation mode may be a number of copies to print set by a user with the operating panel 32. In that case, an operation mode is set to MD1 if a number of copies to print set by a user is equal to or smaller than n or m, for example. Alternatively, an operation mode is set to MD2 if a number of copies to print set by a user is equal to or larger than n+1 or m+1, for example. That is, an operation mode may be set to MD1 or MD2, based on a number of copies to print for each one of original documents MS that are being printed.

A switch from one of the way of operation 1 illustrated in FIG. 4 and the ways of operation 2 to 5 illustrated in FIGS. 13A to 13D to another one of the way of operation 1 illustrated in FIG. 4 and the ways of operation 2 to 5 illustrated in FIGS. 13A to 13D may be possible. For example, information that indicates the ways of operation 1 to 5 is preliminarily stored in a non-volatile memory, such as a ROM, of the image forming apparatus 200. A way of operation is set based on information read from the non-volatile memory when the image forming apparatus 200 is activated.

As described above, in the embodiment illustrated in FIGS. 13A to 13D, sheets are not wastefully printed, and security is improved, similarly to the embodiment illustrated in FIGS. 1 to 12B. If a plurality of conditions is set that is likely to lead to a wrong size of a sheet in the embodiment illustrated in FIGS. 13A to 13D, and discrepancy between sizes of a sheet occurs, a sheet SH that has been printed is ejected, and recovery printing is prohibited.

According to the way of operation 5, if it is likely that a whole image generated by the printer section 40 will not be printed on a sheet SH, the sheet SH is ejected, and recovery printing is allowed. Consequently, a user uses a sheet SH that has an appropriate size to perform printing again without removing a sheet SH from the conveyance section 50. Consequently, efficiency of printing is improved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
a conveyor configured to convey a sheet;
a sensor configured to detect the sheet conveyed by the conveyor; and
control circuitry configured to:
cause the conveyor to eject the sheet without stopping conveyance of the sheet and prohibit recovery printing when a size of the sheet determined based on detection of the sheet by the sensor is different from a setting size in a first operation mode; and
cause the conveyor to stop conveyance of the sheet and allow recovery printing when the size of the sheet is different from the setting size in a second operation mode in which a number of times of printing is larger than a number of times of printing in the first operation mode.

2. The image forming apparatus according to claim 1, wherein the first operation mode is a mode in which one sheet is printed for each request for printing or each original document,
wherein the second operation mode is a mode in which a plurality of sheets is printed for each request for printing or each original document.

3. The image forming apparatus according to claim 1,
wherein the first operation mode is a mode in which one side of one sheet is printed for each request for printing or each original document,
wherein the second operation mode is a mode in which both sides of one sheet are printed for each request for printing or each request for printing or a mode in which a plurality of sheets is printed for each request for printing or each original document.

4. The image forming apparatus according to claim 1, further comprising a plurality of sheet feed trays,
wherein the first operation mode is a mode in which a sheet is printed that is fed from a particular sheet feed tray of the plurality of sheet feed trays.

5. The image forming apparatus according to claim 4,
wherein the particular sheet feed tray is a bypass tray.

6. The image forming apparatus according to claim 1,
wherein the control circuitry is configured to allow recovery printing when the size of the sheet is smaller than the setting size in the first operation mode.

7. The image forming apparatus according to claim 1,
wherein the control circuitry is configured to stop the conveyance of the sheet in the second operation mode after the sheet is conveyed to an ejection port.

8. The image forming apparatus according to claim 1,
wherein the control circuitry is configured to determine that the size of the sheet is different from the setting size when a period of time for which the sheet passes the sensor is out of a predetermined range.

9. The image forming apparatus according to claim 1, further comprising:
a plurality of image forming devices configured to form different color images based on image data; and
a plurality of transfer devices to sequentially transfer the different color images to the sheet to print a composite color image on the sheet,
wherein the control circuitry is configured to cause the conveyor to eject the sheet, on which the composite color image is printed, in the first operation mode.

10. An image forming apparatus comprising:
conveying means for conveying a sheet;
detecting means for detecting the sheet conveyed by the conveying means; and
control means for:
causing the conveying means to eject the sheet without stopping conveyance of the sheet and prohibiting recovery printing when a size of the sheet determined based on detection of the sheet by the detecting means is different from a setting size in a first operation mode; and
causing the conveying means to stop conveyance of the sheet and allowing recovery printing when the size of the sheet is different from the setting size in a second operation mode in which a number of times of printing is larger than a number of times of printing in the first operation mode.

11. An image forming method comprising:
detecting a sheet conveyed by a conveyor;
causing the conveyor to eject the sheet without stopping conveyance of the sheet and prohibiting recovery printing when a size of the sheet determined based on detection of the sheet is different from a setting size in a first operation mode; and
causing the conveyor to stop conveyance of the sheet and allowing recovery printing when the size of the sheet is different from the setting size in a second operation mode in which a number of times of printing is larger than a number of times of printing in the first operation mode.

* * * * *